(12) United States Patent
Ye et al.

(10) Patent No.: US 10,779,333 B2
(45) Date of Patent: Sep. 15, 2020

(54) EARLY DATA TRANSMISSION IN WIRELESS COMMUNICATION SYSTEM

(71) Applicant: Apple Inc., Cupertino, CA (US)

(72) Inventors: Qiaoyang Ye, Fremont, CA (US); Debdeep Chatterjee, San Jose, CA (US); Bharat Shrestha, Hillsboro, CA (US); Marta Martinez Tarradell, Hillsboro, OR (US); Dmitry Dikarev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/141,202

(22) Filed: Sep. 25, 2018

(65) Prior Publication Data

US 2019/0045554 A1 Feb. 7, 2019

Related U.S. Application Data

(60) Provisional application No. 62/669,777, filed on May 10, 2018, provisional application No. 62/653,723, (Continued)

(51) Int. Cl.
*H04W 74/08* (2009.01)
*H04L 5/00* (2006.01)
(Continued)

(52) U.S. Cl.
CPC ......... *H04W 74/0833* (2013.01); *H04L 5/001* (2013.01); *H04L 69/22* (2013.01); *H04W 76/27* (2018.02)

(58) Field of Classification Search
CPC .. H04W 74/0833; H04W 76/27; H04L 69/22; H04L 5/001
See application file for complete search history.

(56) References Cited

U.S. PATENT DOCUMENTS

2016/0014815 A1* 1/2016 Vajapeyam ....... H04W 74/0833
370/329
2018/0324854 A1* 11/2018 Phuyal .............. H04W 74/0833
(Continued)

OTHER PUBLICATIONS

NTT DoCoMO, Samsung; "Early Data Transmission"; R2-070300; 3GPP TSG-RAN2 #56 Jan. 10-15, 2007 Sorrento, Italy (Year: 2007).*

(Continued)

*Primary Examiner* — Gary Mui
(74) *Attorney, Agent, or Firm* — Sterne, Kessler, Goldstein & Fox P.L.L.C.

(57) ABSTRACT

Provided herein is design of early data transmission in wireless communication system. An apparatus for a user equipment (UE) includes a processor configured to: encode a physical random access channel (PRACH) sequence from a plurality of PRACH sequence for transmission via a PRACH to perform a random access procedure, wherein indication of support of early data transmission (EDT) that is transmitted during the random access procedure is based on at least one of the plurality of PRACH sequences, higher layer signaling, PRACH resources, PRACH formats, and a payload from the UE; and send the PRACH sequence to a radio frequency (RF) interface; and the RF interface to receive the PRACH sequence from the processor. Design of random access response (RAR) is also disclosed herein.

25 Claims, 5 Drawing Sheets

Related U.S. Application Data filed on Apr. 6, 2018, provisional application No. 62/586,718, filed on Nov. 15, 2017, provisional application No. 62/564,919, filed on Sep. 28, 2017.

(51) Int. Cl.
  *H04W 76/27* (2018.01)
  *H04L 29/06* (2006.01)

(56) References Cited

U.S. PATENT DOCUMENTS

2019/0037447 A1* 1/2019 Lee .................. H04W 74/0833
2019/0141515 A1* 5/2019 Kim ..................... H04W 28/02

OTHER PUBLICATIONS

Ericsson; "Details of solution B for small data transmission in RRC Inactive"; Tdoc R2-1700890; 3GPP TSG-RAN WG2 #97 Athens, Greece, Feb. 13-17, 2017 (Year: 2017).*
Qualcomm Incorporated; "Early data transmission"; R1-1708800; 3GPP TSG-RAN WG1 Meeting #89 Hangzhou, China, May 15-19, 2017 (Year: 2017).*
Qualcomm Incorporated; "UL early data transmission"; R2-1708233; 3GPP TSG-RAN WG2 Meeting #99 Berlin, Germany, Aug. 21-25, 2017 (Year: 2017).*
Qualcomm Incorporated; "DL early data transmission"; R2-1708234; 3GPP TSG-RAN WG2 Meeting #99 Berlin, Germany, Aug. 21, 2017 (Year: 2017).*
Qualcomm Incorporated; "UL early data transmission"; R2-1708239; 3GPP TSG-RAN WG2 Meeting #99 Berlin, Germany, Aug. 21-25, 2017 (Year: 2017).*
Qualcomm Incorporated; "DL early data transmission"; R2-1708240; 3GPP TSG-RAN WG2 Meeting #99 Berlin, Germany, Aug. 21-25, 2017 (Year: 2017).*
Huawei, HiSilicon, Neul; "Early data transmission for the CP solution"; R2-1708300; 3GPP TSG-RAN WG2 Meeting #99 Berlin, Germany, Aug. 21-25, 2017 (Year: 2017).*
ZTE; "Consideration on early data transmission in eFeMTC"; R2-1708380; 3GPP TSG-RAN WG2 Meeting #99 Berlin, Germany, Aug. 21-2tth, 2017 (Year: 2017).*
Ericsson; "Early data transmission for efeMTC UEs"; R2-1708628; 3GPP TSG-RAN WG2 #99 Berlin, Germany, Aug. 21-25, 2017 (Year: 2017).*
Ericsson; "Early data transmission for feNB-IoT UEs"; R2-1708629; 3GPP TSG-RAN WG2 #99 Berlin, Germany, Aug. 21-25, 2017 (Year: 2017).*
MediaTek Inc.; "NB-IOT Early Data Transmission"; R2-1708998; 3GPP TSG-RAN WG2 Meeting #99 Berlin, Germany, Aug. 21-25, 2017 (Year: 2017).*
Intel Corporation; "Early data transmission discussion ofr eFeMTC and FeNB-IoT"; R2-1709194; 3GPP TSG-RAN WG2 Meeting #99 Berlin, Germany, Aug. 21-25, 2017 (Year: 2017).*
Huawe, HlSilicon; "General discussion on early data transmission for MTC"; R2-1709333; 3GPP TSG RAN WG2 #99 Meeting Berlin, Germany, Aug. 21-2tth, 2017 (Year: 2017).*
Huawe, HlSilicon; "Early Data transmisson on dedicated resouce for Rel-15 MTC"; R2-1709334; 3GPP TSG RAN WG2 #99 Meeting Berlin, Germany, Aug. 21-2tth, 2017 (Year: 2017).*
Ericsson, Qualcomm, "New WID on Even further enhanced MTC for LTE," 3GPP TSG RAN Meeting #75, RP-170732, Agenda Item: 10.1.1, (revision of RP-170465), Mar. 6-9, 2017, Dubrovnik, Croatia, 4 pages.
Huawei et al., "New WID on Further NB-IoT enhancements," #3GPP TSG RAN Meeting #75, RP-170852, Agenda Item: 10.1.1, Mar. 6-9, 2017, Dubrovnik, Croatia, 6 pages.

\* cited by examiner

EARLY DATA TRANSMISSION IN WIRELESS COMMUNICATION SYSTEM

CROSS REFERENCES TO RELATED APPLICATIONS

This application claims priority to U.S. provisional patent application No. 62/564,919 filed on Sep. 28, 2017, U.S. provisional patent application No. 62/586,718 filed on Nov. 15, 2017, U.S. provisional patent application No. 62/653,723 filed on Apr. 6, 2018 and U.S. provisional patent application No. 62/669,777 filed on May 10, 2018, all of which are incorporated herein by reference in their entirety for all purposes.

TECHNICAL FIELD

Embodiments of the present disclosure generally relate to wireless communication, and in particular to design of early data transmission.

BACKGROUND ART

In a legacy wireless communication system, there is no data transmission until radio resource control (RRC) connection setup is completed. To reduce latency, early data transmission (EDT) is proposed recently, which is transmitted during a random access procedure. In other word, EDT is performed after physical random access channel (PRACH) transmission and before the RRC connection setup is completed. Design of EDT will be described in the present disclosure.

SUMMARY

An embodiment of the disclosure provides an apparatus for a user equipment (UE), the apparatus comprising: a processor configured to: encode a physical random access channel (PRACH) sequence from a plurality of PRACH sequence for transmission via a PRACH to perform a random access procedure, wherein indication of support of early data transmission (EDT) that is transmitted during the random access procedure is based on at least one of the plurality of PRACH sequences, higher layer signaling, PRACH resources, PRACH formats, and a payload from the UE; and send the PRACH sequence to a radio frequency (RF) interface; and the RF interface to receive the PRACH sequence from the processor.

An embodiment of the disclosure provides an apparatus for a user equipment (UE), the apparatus comprising: a radio frequency (RF) interface to receive a random access response (RAR) from an access node; and a processor configured to: receive the RAR from the RF interface; decode the RAR to obtain an uplink (UL) grant; and determine whether the UL grant is used for scheduling of early data transmission (EDT) that is transmitted during a random access procedure.

An embodiment of the disclosure provides an apparatus for a user equipment (UE), the apparatus comprising: a processor configured to: determine whether to monitor an explicit acknowledge (ACK) in response to Msg3; and monitor the explicit ACK when it is determined to monitor the explicit ACK; and a radio frequency (RF) interface to: receive the explicit ACK.

An embodiment of the disclosure provides an apparatus for a user equipment (UE), the apparatus comprising: a processor configured to: determine, based on an indicator, whether to allow the UE to go to an idle mode upon expiration of a timer after transmission of an acknowledge (ACK) in response to Msg4; and a radio frequency (RF) interface to: send the ACK to an access node that transmits the Msg4.

An embodiment of the disclosure provides an apparatus for a user equipment (UE), the apparatus comprising: a processor configured to: determine a first candidate transport block size (TBS) value as the largest candidate TBS value of a plurality of candidate TBS values; and determine, based on the first candidate TBS value, a target TBS value for transmission of Msg3 with early data transmission (EDT) that is transmitted during a random access procedure; and a memory interface to store the first candidate TBS value.

An embodiment of the disclosure provides an apparatus for a user equipment (UE), the apparatus comprising: a radio frequency (RF) interface to: receive a modulation and coding scheme (MCS)/transport block size (TBS) indication field of an uplink (UL) grant or a resource assignment field from an access node; and a processor configured to: receive the MCS/TBS indication field or the resource assignment field from the RF interface; and determine, based on the MCS/TBS indication field or the resource assignment field, a number of resource allocation units for Msg3 with early data transmission (EDT) that is transmitted during a random access procedure.

An embodiment of the disclosure provides an apparatus for a user equipment (UE), the apparatus comprising: a processor configured to: decode a repetition number field of an uplink (UL) grant for Msg3 with early data transmission (EDT) that is transmitted during a random access procedure to obtain a number of repetitions indicated by the repetition number field; and determine a number of repetitions for a first candidate transport block size (TBS) value of a plurality of candidate TBS values based on the number of repetitions indicated by the repetition number field; and a memory interface to store the number of repetitions for the first candidate TBS value.

An embodiment of the disclosure provides an apparatus for a user equipment (UE), the apparatus comprising: a processor configured to: encode an indicator in a Msg3 with early data transmission (EDT) that is transmitted during a random access procedure, wherein the indicator is configured to indicate a target transport block size (TBS) value selected by the UE; and a radio frequency (RF) interface to receive the indicator from the processor.

BRIEF DESCRIPTION OF THE DRAWINGS

Embodiments of the disclosure will be illustrated, by way of example and not limitation, in the figures of the accompanying drawings in which like reference numerals refer to similar elements.

DETAILED DESCRIPTION OF EMBODIMENTS

Various aspects of the illustrative embodiments will be described using terms commonly employed by those skilled in the art to convey the substance of their work to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in an embodiment" is used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

Figure 1:
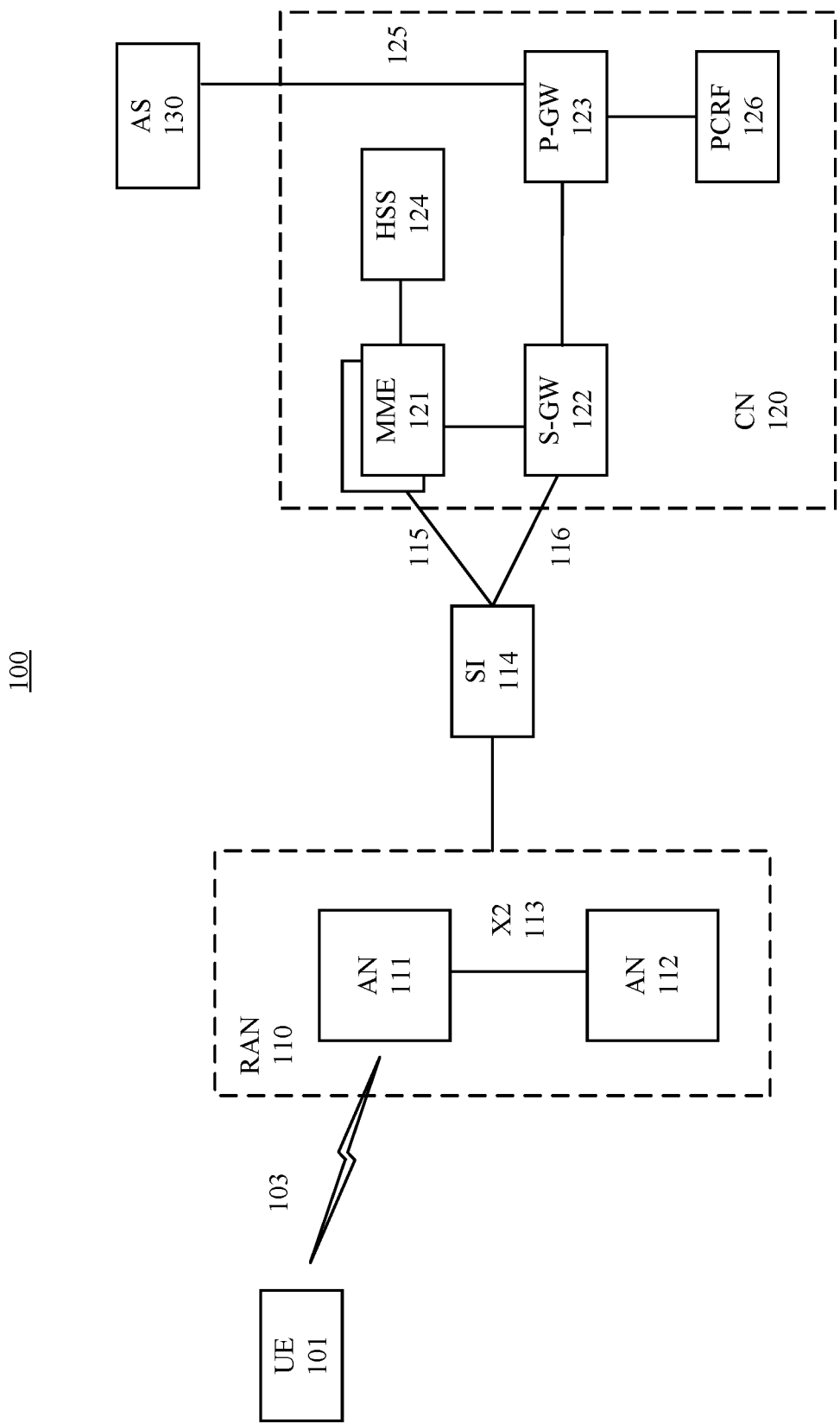
FIG. 1 shows an example of a communication system in accordance with some embodiments of the disclosure.

FIG. 1 shows an example of a communication system 100 in accordance with some embodiments of the disclosure. The communication system 100 is shown to include a user equipment (UE) 101. The UE 101 is illustrated as a smartphone (e.g., a handheld touchscreen mobile computing device connectable to one or more cellular networks). However, it may also include any mobile or non-mobile computing device, such as a personal data assistant (PDA), a tablet, a pager, a laptop computer, a desktop computer, a wireless handset, or any computing device including a wireless communications interface.

In some embodiments, the UE 101 may include an Internet of Things (IoT) UE, which may include a network access layer designed for low-power IoT applications utilizing short-lived UE connections. An IoT UE may utilize technologies such as machine-to-machine (M2M), machine-type communications (MTC), enhance MTC (eMTC), and narrow band IoT (NB-IoT) for exchanging data with an IoT server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 101 may be configured to connect, e.g., communicatively couple, with a radio access network (RAN) 110, which may be, for example, an Evolved Universal Mobile Telecommunications System (UMTS) Terrestrial Radio Access Network (E-UTRAN), a NextGen RAN (NG RAN), or some other type of RAN. The UE 101 may operate in consistent with cellular communications protocols, such as a Global System for Mobile Communications (GSM) protocol, a Code-Division Multiple Access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

The RAN 110 may include one or more access nodes (ANs). These ANs may be referred to as base stations (BSs), NodeBs, evolved NodeBs (eNBs), next Generation NodeBs (gNBs), and so forth, and may include ground stations (e.g., terrestrial access points) or satellite stations providing coverage within a geographic area (e.g., a cell). As shown in FIG. 1, for example, the RAN 110 includes AN 111 and AN 112. The UE 101 may enable communicative coupling with the RAN 110 by utilizing connection 103 with AN 111, as shown in FIG. 1. The AN 111 and AN 112 may communicate with one another via an X2 interface 113. The AN 111 and AN 112 may be macro ANs which may provide lager coverage. Alternatively, they may be femtocell ANs or picocell ANs, which may provide smaller coverage areas, smaller user capacity, or higher bandwidth compared to a macro AN. For example, one or both of the AN 111 and AN 112 may be a low power (LP) AN. In an embodiment, the AN 111 and AN 112 may be the same type of AN. In another embodiment, they are different types of ANs.

The AN 111 may terminate the air interface protocol and may be the first point of contact for the UE 101. In some embodiments, the ANs 111 and 112 may fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UE 101 may be configured to communicate using Orthogonal Frequency-Division Multiplexing (OFDM) communication signals with the AN 111 or with other UEs over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and Proximity-Based Service (ProSe) or sidelink communications), although the scope of the embodiments is not limited in this respect. The OFDM signals can include a plurality of orthogonal subcarriers.

In some embodiments, a downlink resource grid may be used for downlink transmissions from the AN 111 to the UE 101, while uplink transmissions may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 101. The physical downlink control channel (PDCCH) may carry information about the transport format and resource allocations related to the PDSCH channel, among other things. It may also inform the UE 101 about the transport format, resource allocation, and Hybrid Automatic Repeat Request (HARD) information related to the uplink shared channel. Typically, downlink scheduling (assigning control and shared channel resource blocks to the UE 101 within a cell) may be performed at the AN 111 based on channel quality information fed back from the UE 101. The downlink resource assignment information may be sent on the PDCCH used for (e.g., assigned to) the UE 101.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. The PDCCH MAY be transmitted using one or more CCEs, depending on the size of the downlink control information (DCI) and the channel condition. There may be four or more different PDCCH formats defined in LTE with different numbers of CCEs (e.g., aggregation level, L=1, 2, 4, or 8)

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120 via a S1 interface 114. In some embodiments, the CN 120 may be an evolved packet core (EPC) network, a NextGen Packet Core (NPC) network, or some other type of CN. In an embodiment, the S1 interface 114 is split into two parts: the S1-mobility management entity (MME) interface 115, which is a signaling interface between the ANs 111 and 112 and MMES 121; and the S1-U interface 116, which carries traffic data between the ANs 111 and 112 and a serving gateway (S-GW) 122.

In an embodiment, the CN 120 may comprise the MMES 121, the S-GW 122, a Packet Data Network (PDN) Gateway (P-GW) 123, and a home subscriber server (HSS) 124. The MMES 121 may be similar in function to the control plane of legacy Serving General Packet Radio Service (GPRS) Support Nodes (SGSN). The MMES 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-AN handovers and also may provide an anchor for inter-3GPP mobility. Other responsibilities may include lawful intercept, charging, and some policy enforcement.

The P-GW 123 may terminate a SGi interface toward a PDN. The P-GW 123 may route data packets between the CN 120 and external networks such as a network including an application server (AS) 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In an embodiment, the P-GW 123 is communicatively coupled to an application server 130 via an IP communications interface. The application server 130 may also be configured to support one or more communication services (e.g., Voice-over-Internet Protocol (VoIP) sessions, PTT sessions, group communication sessions, social networking services, etc.) for the UE 101 via the CN 120.

The P-GW 123 may further be responsible for policy enforcement and charging data collection. Policy and Charging Rules Function (PCRF) 126 is a policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with an appropriate traffic flow template (TFT) and QoS class of identifier (QCI), which commences the QoS and charging as specified by the application server 130.

The quantity of devices and/or networks illustrated in FIG. 1 is provided for explanatory purposes only. In practice, there may be additional devices and/or networks, fewer devices and/or networks, different devices and/or networks, or differently arranged devices and/or networks than illustrated in FIG. 1. Alternatively or additionally, one or more of the devices of system 100 may perform one or more functions described as being performed by another one or more of the devices of system 100. Furthermore, while "direct" connections are shown in FIG. 1, these connections should be interpreted as logical communication pathways, and in practice, one or more intervening devices (e.g., routers, gateways, modems, switches, hubs, etc.) may be present.

In the present disclosure, design of EDT during a random access procedure will be described, in particular for eMTC (including enhanced further enhanced MTC (efeMTC) in Release 15) and NB-IoT (including further enhanced NB-IoT (feNB-IoT) in Release 15) system. However, the embodiments of the present disclosure may also be applied to other LTE and 5G systems where early data transmission is supported, e.g. as a part of INACTIVE and light connection.

Figure 2:
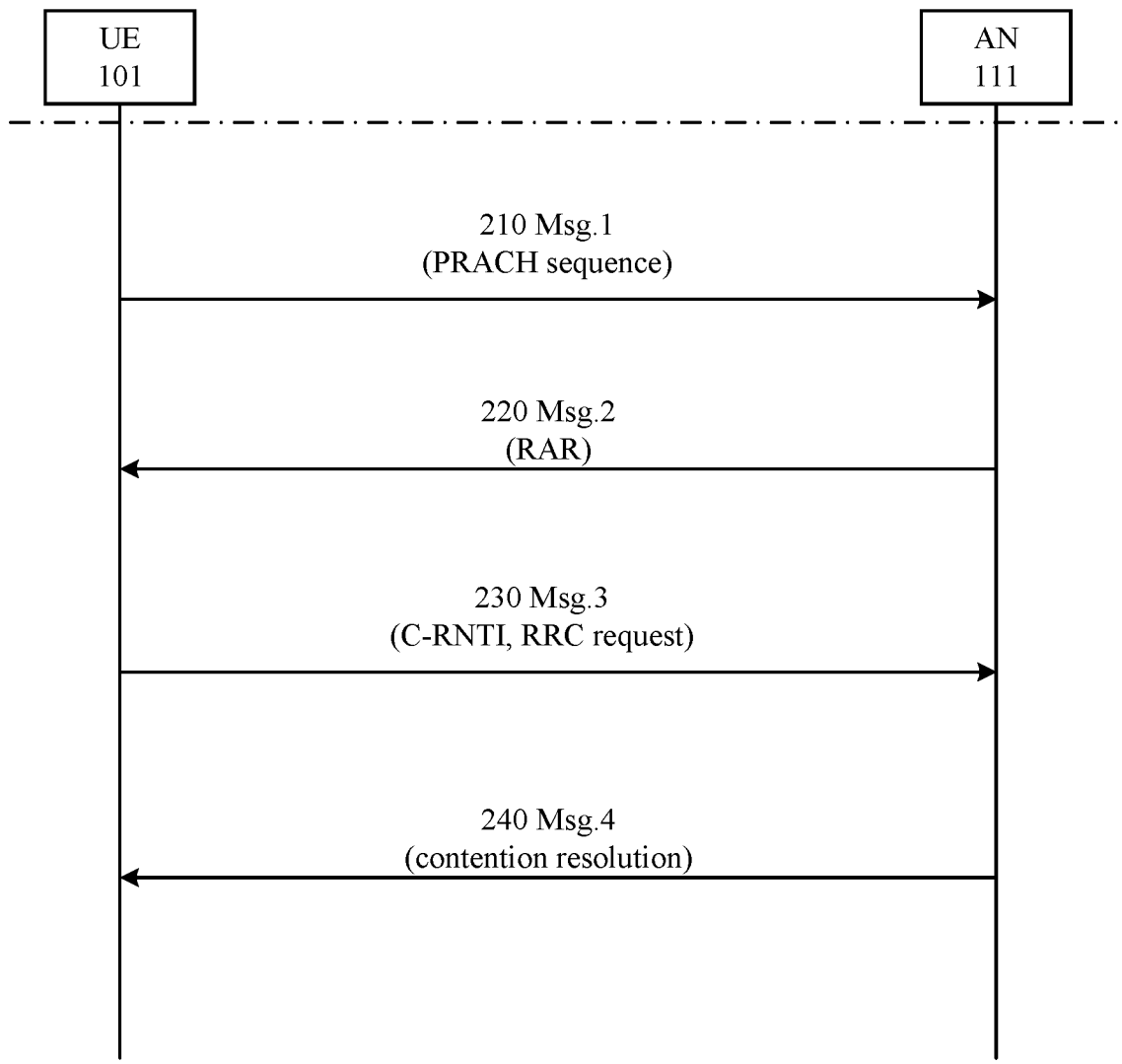
FIG. 2 is a flow chat illustrating a random access procedure in accordance with some embodiments.

FIG. 2 is a flow chat illustrating a random access procedure in accordance with some embodiments. In step 210, a UE (e.g., the UE 101 in FIG. 1) may transmit Message 1 (Msg1) to an AN (e.g., the AN 111) via a PRACH (or NPRACH for an NB-IoT system, collectively called PRACH herein). The Msg1 may include a PRACH sequence. After receiving the Msg1, in step 220, the AN may respond to the UE with Msg2 via e.g., PDSCH. The Msg2 may include a random access response (RAR), which may include uplink (UL) grant for the UE. In step 230, the UE may, in response to the Msg2, transmit Msg3 to the AN via, e.g., physical uplink share channel (PUSCH). The Msg3 may include a cell radio network temporary identifier (C-RNTI) and a corresponding request, e.g., rrcConnectionRequest, rrcConnectionReconfiigurationComplete, rrcConnectionReestablishmentRequest, and the like. In step 240, the AN may, in response to the Msg3, transmit Msg4 to the UE via, e.g., PDSCH. The Msg4 may include contention resolution for the UE.

Design of UL grant in RAR and the design of Msg3 in a Release 13 eMTC system will be described first. Downlink control information (DCI) contents of the UL grant in the RAR are given by Table 1. A modulation scheme and/or coding rate and transport block size (TBS) may be determined from modulation and coding scheme (MCS) field. There are 8 MCS indices, i.e., 0 through 7, for coverage enhancement (CE) mode A in accordance with Table 8.6.1-1 in specification 36.213, and there are 4 MCS indices, i.e., 0 through 3, for CE mode B in accordance with Table 7.1.7.2.1-1 in specification 36.213. By reading these tables, the TBS values for Msg3 for CE mode A and CE mode B are summarized in Table 2 and Table 3 respectively. As 4 bits are used for physical resource block (PRB) assignment in CE mode A, based on the calculation of resource indication value (MV) which takes values from 0 to 15, the number of allocated PRBs may not be 4 or 5. Thus, the TBS values for CE mode A may only be the values corresponding to number of PRBs 1, 2, 3 and 6 in Table 2.

TABLE 2

TBS values for Msg3 for CE mode A in an eMTC system
TBS value table for CE mode A for Msg3

| $I_{TBS}$ | \multicolumn{6}{c}{$N_{PRB}$} |
|---|---|---|---|---|---|---|
| | 1 | 2 | 3 | 4 | 5 | 6 |
| 0 | 16 | 32 | 56 | 88 | 120 | 152 |
| 1 | 24 | 56 | 88 | 144 | 176 | 208 |
| 2 | 32 | 72 | 144 | 176 | 208 | 256 |
| 3 | 40 | 104 | 176 | 208 | 256 | 328 |
| 4 | 56 | 120 | 208 | 256 | 328 | 408 |
| 5 | 72 | 144 | 224 | 328 | 424 | 504 |
| 6 | 328 | 176 | 256 | 392 | 504 | 600 |
| 7 | 104 | 224 | 328 | 472 | 584 | 712 |

TABLE 3

TBS values for Msg3 for CE mode B in an eMTC system
TBS value table for CE mode B for Msg3

| $I_{TBS}$ | \multicolumn{2}{c}{$N_{PRB}$} |
|---|---|---|
| | 1 | 6 |
| 0 | 56 | 152 |
| 1 | 88 | 208 |
| 2 | 144 | 256 |
| 3 | 176 | 328 |

For a Release 13 NB-IoT system, the DCI contents for UL grant in RAR is given by Table 4. The TBS value for Msg3 may only be 88 bits.

TABLE 4

DCI contents of UL grant in RAR for an NB-IoT system

| Contents | Size |
|---|---|
| UL subcarrier spacing (3.75 kHz or 15 kHz) | 1 bit |
| Msg3 subcarrier allocation | 6 bits (same as in UL grant) |
| Resource assignment | 3 bits |

TABLE 1

DCI contents of UL grant in RAR for an eMTC system

| DCI contents | Field size for CE mode A | Field size for CE mode B | Description |
|---|---|---|---|
| Msg3 narrowband index | ceil(log2(number of narrowbands)) | 2 | NB index of Msg3 scheduling |
| PRB assignment | 4 | 3 | PRB location within the configured narrowband in narrowband index field. |
| Repetition number | 2 | 3 | The repetition level of Msg 3 is dynamically indicated based on a set of values configured by higher layers. |
| MCS | 3 | 2 | MCS/TBS |
| TPC | 3 | 0 | TPC is supported in CE mode A |
| A-CSI | 1 | 0 | A-CSI is supported in CE mode A |
| UL delay | 1 | 0 | |
| Msg3/4 MPDCCH narrow band index | 2 | 2 | NB index of MPDCCH carrying Msg3 ReTx and Msg4 |
| Total | 20 | 12 | |

TABLE 4-continued

DCI contents of UL grant in RAR for an NB-IoT system

| Contents | Size |
| --- | --- |
| Scheduling delay | 2 bits (same as NPUSCH) |
| MCS/TBS indication (3 states used to indicate the 3 options for TBS = 88 bits from agreed NPUSCH MCS/TBS tables. Reserve the other states for future) | 3 bits (000 is pi/2 BPSK for ST and QPSK for MT, N_RU = 4 001 is pi/4 QPSK for ST and QPSK for MT, N_RU = 3 010 is pi/4 QPSK for ST and QPSK for MT, N_RU = 1 Others are reserved) |
| Repetition number | 3 bits |
| Other padding bits | As specified by RAN2 |

Indication of Support of Early Data Transmission and Applicability of Early Data Transmission In some embodiments, the UE may encode a PRACH sequence for transmission via a PRACH to perform a random access procedure. The PRACH sequence used by the UE may be selected from a plurality of PRACH sequences. In some embodiments, support of EDT that is transmitted during the random access procedure may be indicated by one or both of the UE and the AN. In an embodiment, the EDT may include UL transmission, for example, the transmission via Msg3. In another embodiment, the EDT may include downlink (DL) transmission, for example, the transmission via Msg2 or Msg4.

In some embodiments, the indication of support of EDT may be based on at least one of higher layer signaling, PRACH resources, PRACH sequences, PRACH formats, and a payload from the UE.

In an embodiment, the higher layer signaling may be used to indicate whether the AN supports EDT. In an embodiment, the higher layer signaling may include a system information (SI) message, such as master information block (MIB), system information block 1 (SIB1), or system information block 2 (SIB2). Explicit indication may be carried in the SI message. For example, one bit in the SI message may be used to indicate whether the AN supports the EDT. In an embodiment, the higher layer signaling may include dedicated higher layer signaling, such as RRC Connection Reconfiguration, or RRC Connection Release, and the like, to indicate whether the AN supports the EDT. In an embodiment, the dedicated higher layer signaling may also be used by the AN (e.g., the AN 111) to enable/disable the usage of EDT in a given UE (e.g., the UE 101). This information may also be forwarded or exchanged with the MME (e.g., the MME 121). Moreover, the MME may also inform the AN whether the UE is allowed or not to use EDT feature.

In some embodiments, PRACH resources, PRACH sequences, PRACH formats, or a payload from the UE may be used to indicate whether the UE supports the EDT.

In an embodiment, the PRACH resources/PRACH sequences are divided into different partitions, and one or more partitions of the PRACH resources/PRACH sequences are configured to support the EDT. For example, besides the PRACH resources/sequences configured for a legacy random access procedure which does not support the EDT, e.g., in Release 13, other sets of PRACH resources/sequences may be configured to indicate the support of EDT in Msg2/Msg3/Msg4.

In an embodiment, from the AN's aspect, different PRACH resources/sequences configured for UEs supporting EDT may indicate the support of EDT by corresponding AN implicitly.

In an embodiment, the PRACH resources may include one or both of time resources and frequency resources. For example, a dedicated set of PRACH time resources and/or PRACH frequency resources may be configured to indicate that the UE supports EDT in Msg3. In an embodiment where frequency domain resource partition is used for the indication, different frequency hopping patterns may be configured for different partitions.

As mentioned above, the partitioning in resources may be either in time domain only, or frequency domain only, or in both time and frequency domain. For example, if resource partitioning is used only in time domain, the PRACH resources for UEs supporting EDT may be not overlapped with the PRACH resources for UEs not supporting EDT. For example, the subframes for UEs supporting EDT may be not overlapped with those for UEs not supporting EDT. As another example, if resource partitioning is used only in frequency domain, the PRACH frequency resources for UEs supporting EDT may be not overlapped with other PRACH frequency resources for UEs not supporting EDT. For the NB-IoT system, the different frequency resources may include a dedicated NB-IoT carrier, or N subcarriers (e.g. N=1 or 12). Alternatively, if both time and frequency domain partitions are supported, it is up to the AN to configure a dedicated set of resources for UE supporting EDT. In this case, the PRACH resources for UE supporting EDT may be overlapped with PRACH resources for UEs not supporting EDT in time domain, or in frequency domain (but not in both).

In an embodiment, the partitions of the PRACH sequences are divided based on one or both of root indexes and cyclic shifts of the PRACH sequences. For example, different sets of root indexes and/or cyclic shifts of the PRACH sequences may be configured to indicate whether the UE supports EDT in Msg3. In an embodiment for the NB-IoT system, as an identical NPRACH sequence is used, the partition may be in terms of time and/or frequency domain resources.

In an embodiment, the partitions of the PRACH resources or PRACH sequences are further divided for different CE levels. Among these resources/sequences allocated for EDT, the time/frequency resources and/or sequences can be further separated for different CE levels. For example, different time and/or frequency resources may be allocated to different CE levels supporting EDT. As another example, different sets of PRACH sequences may be configured for different CE levels supporting EDT. In this example, the time and/or frequency resources may be the same or different for different CE levels. Herein, the term "CE level" may refers to both of CE mode A/CE mode B in the eMTC system and coverage level in the NB-IoT system.

In some embodiments, the number of the partitions of the PRACH resources or PRACH sequences is configured to indicate support and/or requirement of multiple transport block size (TBS) values for EDT, e.g., the EDT via Msg3.

In some embodiments, the partitions of the PRACH resources or PRACH sequences are further divided for UL transmission and DL transmission of the EDT separately or for both of the UL transmission and the DL transmission of the EDT. For example, the PRACH resources/sequences are further partitioned to indicate whether the UE supports EDT in Msg3, supports EDT in Msg4, or support EDT in both Msg3 and Msg4.

In some embodiments, different PRACH formats may be defined for the indication of support of EDT. For example, the PRACH formats comprises single-tone PRACH and multi-tone PRACH, and the multi-tone PRACH may indicate the UE supports EDT.

In some embodiments, the payload from the UE is used to indicate whether the UE supports the EDT. In some embodiment, the payload may be used to indicate a desired TBS value for EDT in Msg3.

In an embodiment, the payload may be transmitted following the PRACH sequence via PUSCH transmission. The modulation scheme and/or coding rate and time domain resources for the PUSCH transmission following the PRACH transmission may be predefined, which may depend on CE levels. The PRACH may be used as the reference signal for demodulation of the payload and thus, in an embodiment, there is no demodulation reference signal (DMRS) symbols in the middle of PUSCH transmission. In another embodiment, the PUSCH format 1 or format 2 in LTE or NB-IoT may be used to carry the encoded bits of the payload. Frequency domain resources of the PUSCH for the indication may be the same as that for the PRACH transmission. Alternatively, frequency domain resources of the PUSCH for the indication may be defined as a pre-defined function of the resources for the PRACH transmission.

The embodiments of indication of support of EDT above may be applied to both of UL transmission and DL transmission of EDT. For example, common indication methods may be applied to both Msg3 and Msg4.

In some embodiments, EDT is enabled based on CE levels. In an embodiment, EDT in the eMTC system is enabled only in CE mode A, or only in CE mode B. Alternatively, EDT may be enabled for both CE mode A and CE mode B. In an embodiment, EDT in the NB-IoT system is enabled only for UEs in a certain coverage level, e.g. a coverage level no higher than X or no lower than X. For example, X may be an index to indicate coverage levels, e.g. X=1. X may be defined in a standard or broadcasted in MIB or other SIBS. Alternatively, EDT may be enabled in all coverage levels.

Design of RAR

In some embodiments, as mentioned above, the AN may, in response to the PRACH sequence from the UE, transmit a RAR to the UE. The UE may decode the RAR to obtain a UL grant, and determine whether the UL grant is used for scheduling of EDT.

In some embodiments, whether the UL grant is used for scheduling of EDT may be determined based on an indicator. The indicator may be carried via at least one of an additional bit in the UL grant, a reserved bit in the RAR, an additional bit in the RAR other than the UL grant, a new field in a medium access control (MAC) header of a MAC protocol data unit (PDU) for the RAR, and a reserved state indicated by a field of the UL grant. The MAC PDU may include the MAC header, one or more RAR each of which corresponds to a respective UE. Each RAR may include a UL grant for corresponding UE and other information field.

In some embodiments, the additional bit in the UL grant, the reserved bit (e.g., the reserved bit "R") in the RAR or the additional bit in the RAR other than the UL grant may indicate whether the UL grant is used for scheduling of EDT.

In some embodiments, the reserved bit in the RAR, e.g., the bit "R", may be used to indicate whether the UL grant is used for scheduling of EDT or the UE have to fall back to the legacy random access procedure without EDT. For example, R=0 may indicate the fall back operation and R=1 may indicate the scheduling of EDT, or vice versa.

In an embodiment where the additional bit in the RAR other than the UL grant is used to indicate whether the UL grant is used for scheduling of EDT, the resources used for PRACH may be shared among UEs supporting EDT and UEs not supporting EDT. This may cause confusion for pre-release UEs, which may also follow the additional bit to interpret the UL grant in the RAR to transmit Msg3. This may cause additional UE power consumption.

In some embodiments, the new field in the MAC header for the RAR may indicate a starting RAR from which Msg3 with EDT will be supported for this RAR and its subsequent RARs.

In some embodiments where the indicator is carried via one of the additional bit in the UL grant, the reserved bit in the RAR, the additional bit in the RAR other than the UL grant and the new field in the MAC header for the RAR, for example, for an eMTC system, different number of bits may be used in the PRB assignment field and/or MCS/TBS indication field for CE mode A and/or CE mode B to schedule EDT, e.g., Msg3 with EDT.

In an embodiment, the UL grant may include a MCS/TBS indication field that includes less bits than that for a random access procedure without EDT, e.g., the random access procedure in Release 13 where EDT is not supported. For example, one bit may be used for MCS/TBS indication field to indicate the modulation order (e.g. QPSK or 16QAM), while the TBS value may be predefined, which, in an embodiment, may depend on CE levels.

In an embodiment, the UL grant may include a MCS/TBS indication field that includes more bits than that for a random access procedure without EDT. More bits in the MCS/TBS indication field may be configured to indicate a larger range of TBS values. For example, 1 or 2 bits may be added to a legacy MCS/TBS indication field, to indicate a wider range of TBS values. For CE mode A, with additional N bits, the Imcs or Ims values may be 0 to $2^{N+3}-1$ (e.g., 0 to 15 with N=1); and for CE mode B, with additional N bits, the Imcs or Ims values may be 0 to 2'4 (e.g., 0 to 7 with N=1). Alternatively, the Imcs or Ims values may be any subset of $\{0, 1, 2, 3, \ldots, 10\}$, e.g., $\{0, 1, 2, 3, 5, 7, 9, 10\}$. In an example, only when the indicated Imcs or Ims value is larger than what has been supported in Release 13, the UE may interpret that the EDT in Msg3 is scheduled, otherwise, UE may fall back to legacy Msg3 transmission without EDT.

Compared with the random access procedure without ECT where the MCS/TBS indication field is only configured to indicate TBS values in CE mode B, the MCS/TBS indication field in an embodiment in accordance with the present disclosure is configured to indicate a combination of a modulation scheme (e.g., a modulation order) and/or coding scheme (e.g., a coding rate) with a TBS value. For example, a plurality of bits may be used for the MCS/TBS indication field to indicate the modulation order and/or coding scheme and TBS value, e.g., N=2 bits are used to indicate 4 possible combinations of modulation schemes and/or coding schemes with TBS values.

In an embodiment, the UL grant may include a PRB assignment field that includes less bits than that for a random access procedure without EDT. The PRB assignment may be reduced, e.g. to 0 bit based on a predefinition. For example, 6 PRBs are allocated for EDT for CE mode A and 2 PRBs are allocated for EDT for CE mode B. As another example, 2 PRBs (e.g., the first or last 2 PRBs) are allocated for EDT for CE mode A and 1 PRB (e.g., the first or last one PRB) is allocated for EDT for CE mode B. Alternatively, the PRB assignment field may include one or more bits. For example, one bit may be used to indicate two sets of PRB allocation, e.g. 3 (first or last 3 which may be predefined) or 6 PRBs for CE mode A, and/or 1 (first or last one which may be predefined) or 2 PRBs for CE mode B.

As mentioned above, in some embodiments, the additional bit in the UL grant, the reserved bit in the RAR, or the additional bit in the RAR other than the UL grant may indicate whether the UL grant is used for scheduling of EDT in an explicit way. In some embodiments, one of the additional bit in the UL grant, the reserved bit in the RAR, and the additional bit in the RAR other than the UL grant is configured to indicate whether a field in the UL grant is required to be interpreted in a different way from that for a random access procedure without EDT. In this way, the additional bit in the UL grant, the reserved bit in the RAR, or the additional bit in the RAR other than the UL grant may be configured to indicate whether the UL grant is used for scheduling of EDT in an implicit way. Alternatively, another additional bit in the UL grant, another reserved bit in the RAR, or another additional bit in the RAR other than the UL grant is configured to indicate whether a field in the UL grant is required to be interpreted in a different way from that for a random access procedure without EDT.

If it is indicated to interpret in a different way from that for the random access procedure without EDT, the MCS/TBS indication field may be re-interpreted. In some embodiments, compared with the TBS values in the random access procedure without EDT, the MCS/TBS indication field may be re-interpreted to indicate one or more larger TBS values with an offset to the TBS value in the random access procedure without EDT. In an embodiment, a set of offsets may be predefined or configured by higher layer signaling. In an embodiment, the indication of offset to the TBS value is enabled based on different CE levels. In an embodiment, different offsets may be configured for different CE levels. In an embodiment, if the scheduled TBS value is smaller than a threshold (e.g. for the eMTC system), the UE will fall back to the legacy random access procedure without EDT. The threshold can be predefined or semi-statically configured. In some embodiments, a new TBS table may be defined, and the MCS/TBS indication field with the same size as that of legacy random access procedure may be used to indicate different TBS values from that in the legacy random access procedure. In an embodiment, the new TBS table may be a truncated version of the existing TBS table, or a version with some elements replaced by larger TBS values. For example, a set of Ims values may be predefined or semi-statically configured for random access procedure with EDT, and the MCS/TBS indication field may be used to indicate one of the ITBs values.

Instead of the offset(s) being predefined or configured by higher layer signaling, in some embodiments, the UL grant may include an additional bit to indicate an offset to a TBS value. The additional bit to indicate an offset may be used in combination with the MCS/TBS indication field for the eMTC system and/or for the NB-IoT system, to indicate additional offset to the TBS value indicated by the MCS/TBS indication field of the UL grant. In an embodiment, a set of offsets may be predefined or configured by higher layer signaling. In an embodiment, the indication of offset to the TBS value is enabled based on different CE levels. In an embodiment, different offsets may be configured for different CE levels.

In some embodiments, the UE may determine that the UL grant is used for scheduling of EDT, when the UE transmits a PRACH sequence via a PRACH resource that is dedicated for the EDT or the UE transmits a PRACH sequence dedicated for the EDT. As long as the UE transmits the PRACH sequence corresponding to the resources/sequences supporting EDT, the UL grant will be re-interpreted in a way supporting EDT. In this example, the AN may not be able to schedule the same TBS as for legacy Msg3.

In some embodiments, the indicator to indicate whether the UL grant is used for scheduling of EDT is carried via a reserved state indicated by a field of the UL grant, for example, for an NB-IoT system. As 3 bits are used for MCS/TBS indication field to indicate only 3 states, the reserve states may be used for the scheduling of EDT. This may be applied regardless of how the PRACH resources are configured for UEs supporting and not support early data transmission. Once the UE detects that the MCS/TBS indication field has states other than 000, 001 or 010, the UE that does not supporting EDT would consider corresponding RAR as a failed detection. In an embodiments, less bits may be used in at least one of a UL subcarrier spacing field, a Msg3 subcarrier allocation field, a resource assignment field and a MCS/TBS indication field within the UL grant.

In an embodiment, for example, the supported sub-PRB allocations may be limited for EDT in Msg3. In an embodiment, only multi-tone PUSCH is supported for EDT. In this embodiment, the UL subcarrier spacing field is not necessary, thus, for example, the UL subcarrier spacing field may be cancelled, and the size of the Msg3 subcarrier allocation filed may be reduced. In an embodiment, only 15 kHz subcarrier spacing or only 3.75 kHz subcarrier spacing is supported for EDT in Msg3. In this embodiment, the UL subcarrier spacing field is not necessary, thus, for example, the UL subcarrier spacing field may be cancelled. In an embodiment, the MCS/TBS indication field may have less bits, by predefining a TBS value for EDT.

In some embodiments, format of the RAR in the random access procedure with EDT may be the same as pre-release random access procedure without EDT. This may be applied to embodiments where dedicated PRACH resources/sequences are used for UEs supporting EDT, where the UE knows how to interpret the UL grant scheduling EDT, or where a reserved state is used for scheduling of EDT.

In some embodiments, the UE may perform the random access procedure without EDT when determining the UL grant is not used for scheduling of EDT.

As mentioned above, in some embodiments, the bits included in a field of the UL grant or in the RAR may be reduced or additional bit(s) may be added. The size of the UL grant in the random access procedure with EDT may be the same as or different from that of the UL grant in the legacy random access procedure without EDT. Similarly, the size of the RAR in the random access procedure with EDT may be the same as or different from that of the RAR in the legacy random access procedure without EDT.

In an embodiment where the size of the UL grant in the random access procedure with EDT is different from that of the UL grant in the legacy random access procedure without EDT, the resources for PRACH are shared among UEs supporting EDT and UEs not supporting EDT. The UEs may identify whether this UL grant is for scheduling of EDT based on the size of the UL grant. In one example of this embodiment, a new header can be introduced to RAR to indicate the size of the UL grant, e.g. by indicating the starting and ending location of the UL grant in a new field of the header. For example, in a MAC PDU, all the RARs corresponding to legacy random access procedure without EDT may be sent first, after which the RARs corresponding to Msg3 with EDT (whose size may be different from legacy RAR due to different size of UL grant) may follow.

Alternatively, in an embodiment where the size of the UL grant in the random access procedure with EDT is different from that of the UL grant in the legacy random access procedure without EDT, the resources for PRACH are separated among UEs supporting EDT and UEs not supporting EDT. The PRACH resource configuration may ensure that all the RARs to be carried by Msg2 correspond to either UEs not supporting EDT or UEs supporting EDT. Then all the RARs carried in a MAC PDU may have the same size. In this case, MAC header for RAR can be the same (no new field is needed).

In an embodiment, the size of the UL grant in the random access procedure with EDT is the same as that of the UL grant in the legacy random access procedure without EDT, irrespective of early data transmission support. A plurality of indication methods without reduction or addition of bit(s) in the UL grant described above may be applied in this case.

ACK Indication of Msg3

During a random access procedure, the AN may transmit an acknowledge (ACK) in response to Msg3 received from the UE.

In some embodiments, Msg4 scheduling/transmission may serve as the ACK for Msg3 with EDT, which is the same for Msg3 without EDT, e.g., in Release 13. In these embodiments, there is no explicit ACK for Msg3 with EDT.

In some embodiments, an explicit ACK in response to Msg3 is introduced. These embodiments may be applied to both of Msg3 with EDT and Msg3 without EDT, even though Msg3 with EDT are mainly described below.

In some embodiment, the UE may determine whether to monitor the explicit ACK for Msg3 and the UE may monitor the explicit ACK once making a determination to do so.

In some embodiments, whether to monitor the explicit ACK is determined based on at least one of Msg2, predefinition, and a SI message.

In an embodiment, the RAR for the UE in Msg2 may indicate whether to monitor the explicit ACK by the UE. In an embodiment, the UE is always assumed to monitor the explicit ACK. In an embodiment, the use of the explicit ACK for Msg3 may be indicated by a SI message, such as MIB, SIB1, or SIB2, via some indication, for example, via a 1-bit information in the SI message.

Whether to use the explicit ACK is described above. Then the indication of the explicit ACK itself is described below.

In some embodiments, a new radio network temporary identity (RNTI) is defined for PDCCH for scheduling Msg2, to indicate the explicit ACK.

In some embodiments, a temporary cell radio network temporary identity (Temp C-RNTI) is used for the PDCCH for scheduling Msg2, to indicate the explicit ACK.

In some embodiments, a first unused value or a first reserved state indicated by a field (e.g., the MCS/TBS indication field and/or the PRB assignment field) of the Msg2 is configured to indicate the explicit ACK. For example, for CE mode A in the eMTC system, 5 bits are used for PRB assignment within each narrowband. There are 11 unused states that are indicated by the 5 bits for indication of the explicit ACK in CE mode A. For example, for CE mode B in the eMTC system, the Ims is no larger than 9, and thus there are 5 unused values that are indicated by 4 bits in the MCS/TBS indication field. These unused values may be used to indicate the explicit ACK for Msg3. For example, for the NB-IoT system, 4 bits in NPDCCH format N1 are used for MCS indication of Msg2. The number of Ims is up to 10 for in-band mode and 12 for guard-band and standalone modes. There are at least 3 unused values that can be used for indication of the explicit ACK. For example, for the NB-IoT system, the explicit ACK may be indicated by one of the reserved states indicated by the MCS/TBS indication field.

In an embodiment, a second unused value or a second reserved state indicated by a field (e.g., the MCS/TBS indication field and/or the PRB assignment field) of the Msg2 is configured to indicate the UE to go to an idle mode (go back to sleep) after successful transmission of Msg3 with EDT. In an embodiment, an unused value or a reserved state indicated by a field (e.g., the MCS/TBS indication field and/or the PRB assignment field) of the Msg2 is configured to indicate the UE to go to the idle mode after successful reception of Msg4 with EDT.

With configuration of the explicit ACK, in some embodiments, upon reception of such an explicit ACK, the UE may go to the idle mode, and no Msg4 scheduling is expected. For this case, the "ACK-only" early indication signal/channel may include the contention resolution information or other information necessary to indicate contention resolution that is carried in Msg4 in the legacy random access procedure.

In an embodiment, the UE may not simultaneously monitor the explicit ACK and PDCCH for scheduling Msg4 or Msg3 retransmission. A monitoring window for the explicit ACK may be predefined, or indicated by a SI message, such as MIB, SIB1 or SIB2. Different monitoring windows may be predefined or configured for different CE levels. Outside of the monitoring window, the PDCCH for scheduling of Msg3 retransmission or Msg4 may be monitored by the UE.

In an embodiment, the UE may monitor the explicit ACK and the PDCCH simultaneously. Whichever comes earlier, the UE follows the indication correspondingly.

With configuration of the explicit ACK, in some embodiments, it may be indicated by Msg2, e.g., the UL grant in the RAR, whether to go to the idle mode or continue to monitor for PDCCH for scheduling of Msg4 or Msg3 retransmission, upon reception of the explicit ACK.

In some embodiments, the UE may operate in the same way as that in the legacy random access procedure without EDT once it is determined not to monitor the explicit ACK, e.g., the UE may receive an ACK for the Msg3 via Msg4 scheduling/transmission.

Scheduling of Msg4

In some embodiments, scheduling and/or transmission of Msg4 with EDT follows the legacy random access procedure without EDT, for example, in Release 13. Also, the UE's behavior after reception of Msg4 with EDT follows the legacy random access procedure without EDT, for example, in Release 13.

In some embodiments, an indication may be introduced to indicate whether the UE is allowed to go to the idle mode upon expiration of a timer after transmission of an ACK in response to the Msg4 to the AN.

In an embodiment, the indication may be carried in a SI message, such as MIB, SIB1 or SIB2, and thus be a cell-specific configuration. In an embodiment, the indication may be carried in Msg2. In an embodiment, the indication may be carried in the PDCCH which schedules the (re)transmission of Msg4.

In an embodiment, the timer may be predefined or configured by a SI message, such as MIB, SIB1 or SIB2. In an embodiment, different timers may be predefined or configured based on different CE levels.

Whether to allow the UE to go to the idle mode is described above. Indication of UE release, e.g., going to the idle mode, may be described below.

In an embodiment, a new RNTI may be defined for the PDCCH scheduling (re)transmission of Msg4, to indicate the UE to go to the idle mode.

In an embodiment, an unused value or a reserved state indicated by a field (e.g., the MCS/TBS indication field and/or the PRB assignment field) of Msg2 is configured to indicate the UE to go to the idle mode after successful transmission of the ACK, as discussed for indication of the explicit ACK for Msg3 above. In an embodiment, the indication of UE release by the unused value or a reserved state may be used when the PDCCH scheduling (re)transmission of Msg4 is used to carry the indicator that indicates whether to allow the UE to go to the idle mode upon expiration of the timer after transmission of the ACK for Msg4.

How to Determine the Up to 4 Candidate TBS Values

RAN2 has discussed padding issues for EDT in Msg3. From RAN2 point of view, it would be beneficial if the UE could choose a TBS value that requires minimum number of padding bits from a set of possible TBS values according to the UL grant in RAR.

The UL grant for Msg3 with EDT may allow the UE to choose an appropriate TBS value, MCS, repetitions, and resource allocation units (resource units (RUs) for the NB-IoT system) from a set of TBS values provided based on the UL transmission. How to provide possible TBS values, MCS, repetitions, and RUs (for the NB-IoT system) has not been discussed.

Agreements have been made that the maximum TBS value broadcasted in system information is selected from 8 values which are taken from the Rel-13 PUSCH tables; up to 4 possible TBS values which are smaller than or equal to the broadcasted maximum TBS value are available to the UE to choose among. However, how the UE determines the up to 4 candidate values are for further studying.

In the present disclosure, it is to be discussed how to determine the up to 4 candidate TBS values by the UE below. Additional details will be provided on the UL grant design to support the scheduling of up to 4 candidate TBS values smaller than or equal to the maximum TBS value broadcasted by system information for the UE to choose among. However, the embodiments in the present disclosure are not limited in the number of candidate TBS values available to the UE, and other numbers may be applicable besides up to 4 candidate TBS values.

In some embodiments, the UE may determine a first candidate TBS value as the largest candidate TBS value of a plurality of candidate TBS values. The UE then may determine, based on the first candidate TBS value, a target TBS value for transmission of Msg3 with EDT.

In some embodiments, the first candidate TBS value is determined based on a maximum TBS value indicated by a SI message, such as MIB, SIB1, SIB2, and the like. In an embodiment, the first candidate TBS value is determined to be equal to the maximum TBS value. In other words, the largest candidate TBS value among the plurality of candidate TBS values may be equal to the maximum TBS value broadcasted by the SI message. In an embodiment, the first candidate TBS value is determined based on both of the maximum TBS value and the number of resource allocation units allocated to the UE. For example, the first candidate TBS value is determined to be a TBS value of a plurality of TBS values corresponding the allocated number of resource allocation units. The TBS value is the largest one of the plurality of TBS values that is equal to or smaller than the maximum TBS value.

In some embodiments, the first candidate TBS value is determined based on the MCS/TBS indication field in the UL grant for the Msg3 with EDT. The TBS value indicated by the MCS/TBS indication field is used as the largest candidate TBS value, and it is no more than the maximum TBS value broadcasted by the SI message.

For the other candidate TBS values, the following methods may be considered to determine their values. For ease of description, up to 4 candidate TBSs values are illustrated in the embodiments below. As mentioned above, the embodiments in the present disclosure are not limited in the number of candidate TBS values available to the UE, and other numbers may be applicable besides up to 4 candidate TBS values. The plurality of candidate TBS values may be denoted by $X_i$ ("i" is an integer). In the embodiments where there are up to 4 candidate TBS values, the largest candidate TBS value may be denoted by $X_0$, and the other up to 3 candidate TBS values may be denoted by $X_1$, $X_2$ and $X_3$.

In some embodiments, the other up to 3 candidate TBS values $X_1$, $X_2$ and $X_3$ may be determined based on the largest candidate TBS value $X_0$. In some embodiments, $X_1$, $X_2$ and $X_3$ may be determined based on a mapping between $X_0$ and $X_1$, $X_2$ and $X_3$. For example, a predefined mapping from $X_0$ to the set $\{X_1, X_2, X_3\}$ may be used. Note that for a certain value of $X_0$, it is possible that it may only map to $\{X_1, X_2\}$ or $\{X_1\}$, or even only $X_0$ is the possible TBS value to be selected by the UE. For example, when $X_0$ is around 320 bits which is close to the minimum possible TBS value supported for Msg3 with EDT, there is no need to further support other possible smaller TBS values for UE to choose.

In an embodiment, the mapping between $X_0$ and $\{X_1, X_2, X_3\}$ may include a table indicating $X_0$ and corresponding $X_1$, $X_2$ and $X_3$. The table may be predefined. By referring to the table, the UE may know the values of the other up to three smaller candidate TBS values that can be used. As mentioned above, based on the value of $X_0$, it is possible that some rows of the table for certain values of $X_0$ may correspond to nothing or a subset of $\{X_1, X_2, X_3\}$. Table 5 below provides an example of the table to map $X_0$ to values for $\{X_1, X_2, X_3\}$. Table 5 is an example, and the embodiments are not limited in this respect.

TABLE 5

Mapping table indicating $X_0$ and other candidates TBS values

| $X_0$ | Other candidate TBS values |
|---|---|
| ~1000 | 328, 584, 776 |
| ~936 | 328, 504, 712 |
| ~808 | 328, 504, 680 |
| ~712 | 328, 456, 586 |
| ~600 | 328, 424, 504 |
| ~504 | 328, 424 |
| ~424 | 328 |
| ~328 | N/A |

In Table 5, as can be seen, there is a sign "~" before the value of $X_0$. It means the value of $X_0$ may include other candidate TBS values for $X_0$ around the listed values above.

In some embodiments, the other candidate TBS values in the table provide a reference, rather than actual ones. The actual candidate TBS values may be based on the number of resource allocation units indicated by the UL grant. The resource allocation units herein may include PRBs (in the eMTC system or LTE system) or resource units (RUs) and/or subcarries (in the NB-IoT system). The actual candidate TBS values to be selected by UE are determined by the TBS values in the column corresponding to the number of scheduled PRBs in Table 7.1.7.2.1-1 in 36.213 for the eMTC system or the number of indicated RUs in Table 16.5.1.2-2 in 36.213 for the NB-IoT system, which are closest to the values given by the mapping table above. For example, in the eMTC system, if $X_0$ is 1000 bits and number of scheduled PRBs is 6, the candidate TBS values would be 328, 600, 808 and 936 which are the supported TBS values by reading column corresponding to 6 PRBs in Table 7.1.7.2.1-1 in 36.213. Similarly, in the NB-IoT system, if $X_0$ is 1000 bits and $I_{RU}$ is 5, the candidate TBS values would be 328, 600, 808 and 1000 bits.

Alternatively, in some embodiments, the other candidate TBS values in the table may provide exact candidate TBS values (i.e., the actual ones) to be selected by the UE. In an embodiment, the number of PRBs/RUs according to these candidate TBS values (the largest one and other smaller ones) may be determined by the largest number that is smaller or equal to the number of PRBs/RUs indicated by the UL grant and has the corresponding TBS values in its corresponding column in Table 7.1.7.2.1-1 in 36.213 and Table 16.5.1.2-1 in 36.213, respectively. For example, in the eMTC system, if $X_0$ is 936 bits and number of PRBs indicated by the UL grant is 6, the number of PRBs, when UE selects TBS values of 328, 584, 776 and 936, would be 6, 5, 5 and 6 respectively. Similarly, for example, in the NB-IoT system, if $X_0$ is 1000 bits and $I_{RU}$ indicated by the UL grant is 5, the $I_{RU}$, when the UE selects TBS values of 328, 584, 776 and 936, would be 5, 4, 4 and 5 respectively. When the number of PRBs or RUs is less than that indicated by the UL grant, a subset of resources would be used by the UE, e.g. the set of starting PRBs or the set of starting subframes among the allocated ones indicated by the UL grant may be used by the UE.

In some examples, a common mapping table may be used for different CE levels. Alternatively, different mapping tables may be defined for different CE levels.

In an embodiment, the mapping between $X_0$ and $X_1$, $X_2$ and $X_3$ may include a function between the $X_0$ and corresponding $X_1$, $X_2$ and $X_3$. For example, $X_1=f(X_0/4)$, $X_2=f(X_0/2)$, and $X_3=f(X_0*3/4)$, where f may be a function, such as a ceil function, a floor function, a round function or other functions.

In some examples, a common function may be used for different CE levels. Alternatively, different functions may be defined for different CE levels.

In an embodiment, the calculated $X_i$ based on the function may be considered as a reference value. The actual candidate TBS value(s) to be selected by the UE may be obtained by choosing the value(s) closest to the respective reference value $X_i$.

In some embodiments where the first candidate TBS value is determined based on a maximum TBS value indicated by a SI message, the MCS/TBS indication field in the UL grant may be used to indicate one other smaller candidate TBS values, e.g., $\{X_1, X_2, X_3\}$. For example, the smallest candidate TBS value that can be selected by the UE may be indicated by the MCS/TBS indication field.

In an embodiment, the UE may determine only up to two candidate TBS values (i.e., the TBS value indicated by the MCS/TBS indication field and the maximum TBS value broadcasted by the SI message).

In an embodiment, the UE may still determine up to 4 candidate TBS values. The TBS value indicated by the MCS/TBS indication field and the maximum TBS value broadcasted by the SI message provide the range to determine the other two candidate TBS values. For example, the candidate TBS value indicated by the MCS/TBS indication field serves as the smallest candidate TBS value that can be selected by the UE, denoted by $X_3$, the maximum TBS value broadcasted by the SI message serves as the largest candidate TBS value $X_0$, then the $X_1$ and $X_2$ may be any two values between $X_0$ and $X_3$, e.g. $X_1=f((X_0-X_3)*2/3+X_3)$ and $X_2=f((X_0-X_3)/3+X_3)$. Function f(x) may be ceil(x), floor(x), round(x), etc. In an optional embodiment, the calculated $X_1$ may be considered as a reference value where the actual candidate TBS value(s) to be selected by the UE may be obtained by choosing the value(s) closest to the respective reference value $X_1$.

In some embodiments, the UE is configured to use the same frequency domain resource for all of the plurality of candidate TBS values. In some embodiments, the frequency domain resource is indicated by the UL grant.

In above embodiments, $X_i$ is used as a TBS value. Alternative, $X_i$ may indicate a TBS index. Also, the embodiments above with respect to the TBS value may be applied to the TBS index. In this case, the TBS value may be determined by the indicated number of PRBs/RUs and the corresponding TBS index $X_i$.

Method to Indicate PRB/RU Allocations for Different TBS Values

In some embodiments, the UE may determine the number of resource allocation units for Msg3 with EDT based on a resource assignment field in the UL grant, as the legacy random access procedure without EDT. In the eMTC system, the resource assignment field may include the PRB assignment field. In the NB-IoT system, the resource assignment field may include the RU assignment field. Similarly, the indication method of Msg3 subcarrier allocation for EDT may be the same as legacy NB-IoT Msg3.

Alternatively, in some embodiments, the UE may determine the number of resource allocation units for Msg3 with EDT based on the MCS/TBS indication field in the UL grant. In some embodiments, the number of resource allocation units may be determined based on a plurality of states indicated by the MCS/TBS indication field, in particularly for the NB-IoT system.

In some embodiments, the reserved bit 'R' in the RAR may be used to differentiate the UL grant for legacy Msg3 scheduling and that for Msg3 scheduling with EDT. In this case, the 8 states indicated by the 3-bit MCS/TBS indication field may be used to indicate the modulation scheme and/or coding scheme and the number of resource allocation units for EDT.

In some embodiments, the modulation scheme may include pi/2 binary phase shift keying (BPSK) and pi/4 quadrature phase shift keying (QPSK) when the Msg3 is transmitted with a single-tone mode. In some embodiments, selection of the pi/2 BPSK and the pi/4 QPSK may be based on TBS values and the number of resource allocation units. In some embodiments, pi/2 BPSK may be used when the TBS value is equal to 328 and the number of resource allocation units is equal to 8 or 10; otherwise pi/4 QPSK may be used. In some embodiments, the pi/4 QPSK is used for the Msg3 transmitted with the single-tone mode irrespective of TBS values and the number of resource allocation units. In some embodiments, QPSK is used when the Msg3 is transmitted with a multi-tone mode. In some embodiments, the number of RUs may be any value from set $\{1, 2, 3, 4, 5, 6, 8, 10\}$.

In an embodiment, a common table may be designed for all 8 possible maximum TBS values, e.g. as shown in Table 6. Alternatively, in another embodiment, different tables may be designed for different maximum TBS values. For example, Table 6 is designed for cases where the maximum TBS value broadcasted is small (e.g. 4 smaller candidate TBS values accordingly) and Table 7 is designed for cases where the maximum TBS value broadcasted is large (e.g. 4 larger candidate TBS values accordingly). In yet another example, one or more tables (e.g., Table 6 and Table 7) may be defined, and explicit indication may be used to determine which table to be used via e.g. higher layer signaling (e.g., RRC signaling). The configuration of the table(s) may be independent of the configuration of the maximum TBS value.

TABLE 6

Example of MCS index for modulation scheme and the number of resource allocation units for EDT

| MCS Index $I_{MCS}$ | Modulation $\Delta f = 3.75$ kHz or $\Delta f = 15$ kHz and $I_{sc} = 0, 1, \ldots, 11$ | Modulation $\Delta f = 15$ kHz and $I_{sc} > 11$ | Number of RUs $N_{RU}$ |
|---|---|---|---|
| '000' | pi/2 BPSK | QPSK | 8 |
| '001' | pi/2 BPSK | QPSK | 6 |
| '010' | pi/2 BPSK | QPSK | 4 |
| '011' | pi/4 QPSK | QPSK | 8 |
| '100' | pi/4 QPSK | QPSK | 6 |
| '101' | pi/4 QPSK | QPSK | 4 |
| '110' | pi/4 QPSK | QPSK | 3 |
| '111' | pi/4 QPSK | QPSK | 1 |

TABLE 7

Example of MCS index for modulation scheme and the number of resource allocation units for EDT

| MCS Index $I_{MCS}$ | Modulation $\Delta f = 3.75$ kHz or $\Delta f = 15$ kHz and $I_{sc} = 0, 1, \ldots, 11$ | Modulation $\Delta f = 15$ kHz and $I_{sc} > 11$ | Number of RUs $N_{RU}$ |
|---|---|---|---|
| '000' | pi/2 BPSK | QPSK | 8 |
| '001' | pi/4 QPSK | QPSK | 8 |
| '010' | pi/4 QPSK | QPSK | 6 |
| '011' | pi/4 QPSK | QPSK | 5 |
| '100' | pi/4 QPSK | QPSK | 4 |
| '101' | pi/4 QPSK | QPSK | 3 |
| '110' | pi/4 QPSK | QPSK | 2 |
| '111' | pi/4 QPSK | QPSK | 1 |

In some embodiments, no reserved bit 'R' in the RAR is used to differentiate the UL grant for legacy Msg3 scheduling and that for Msg3 scheduling with EDT. The 5 reserved states indicated by the MCS/TBS indication field may be used. Similar to the above embodiments, a common table may be designed for all 8 possible maximum values, e.g. as given by Table 7 where the first 3 rows are the same as that in the legacy NB-IoT system. Alternatively, different tables may be designed for different maximum TBS values. For example, Table 7 is designed for cases where the maximum TBS value broadcasted is small, and Table 8 is designed for cases where the maximum TBS value broadcasted is large. In an embodiment, one or more tables (e.g., Table 7 and Table 8) may be defined, and explicit indication may be used to determine which table to be used via e.g. RRC signaling. The configuration of the table(s) may be independent of the configuration of the maximum TBS value.

TABLE 8

Example of MCS index for modulation scheme and the number of resource

| MCS Index $I_{MCS}$ | Modulation $\Delta f = 3.75$ kHz or $\Delta f = 15$ kHz and $I_{sc} = 0, 1, \ldots, 11$ | Modulation $\Delta f = 15$ kHz and $I_{sc} > 11$ | Number of RUs $N_{RU}$ |
|---|---|---|---|
| '000' | pi/2 BPSK | QPSK | 4 |
| '001' | pi/4 QPSK | QPSK | 3 |
| '010' | pi/4 QPSK | QPSK | 1 |
| '011' | pi/2 BPSK | QPSK | 8 |
| '100' | pi/2 BPSK | QPSK | 6 |
| '101' | pi/4 QPSK | QPSK | 8 |
| '110' | pi/4 QPSK | QPSK | 4 |
| '111' | pi/4 QPSK | QPSK | 1 | allocation units for EDT

TABLE 9

Example of MCS index for modulation scheme and the number of resource allocation units for EDT

| MCS Index $I_{MCS}$ | Modulation $\Delta f = 3.75$ kHz or $\Delta f = 15$ kHz and $I_{sc} = 0, 1, \ldots, 11$ | Modulation $\Delta f = 15$ kHz and $I_{sc} > 11$ | Number of RUs $N_{RU}$ |
|---|---|---|---|
| '000' | pi/2 BPSK | QPSK | 4 |
| '001' | pi/4 QPSK | QPSK | 3 |
| '010' | pi/4 QPSK | QPSK | 1 |
| '011' | pi/2 BPSK | QPSK | 8 |
| '100' | pi/4 QPSK | QPSK | 8 |
| '101' | pi/4 QPSK | QPSK | 6 |
| '110' | pi/4 QPSK | QPSK | 4 |
| '111' | pi/4 QPSK | QPSK | 1 |

In above embodiments, Table 5, Table 6, Table 7 and Table 8 are illustrated to provide some examples. The embodiments are not limited in this respect. Other combinations of modulation scheme and/or coding scheme and number of PRBs/RUs/subcarriers are possible. Even though examples of coding rates are not illustrated in the tables above, the MCS/TBS indication field may also be used to indicate coding schemes.

Indication of the number of resource allocation units is described above. In some embodiment, the indication of the number of resource allocation units above may be used for all of a plurality of candidate TBS values available to the UE.

Alternatively, in some embodiment, the indication of the number of resource allocation units above may be only used for a first candidate TBS value of a plurality of candidate TBS values available to the UE. In an embodiment, the first candidate TBS value is the largest one among the plurality of candidate TBS values, i.e., $X_0$ as above. Determination of the number of resource allocation units for other candidate TBS values will be described below.

In some embodiments, the number of resource allocation units for a second candidate TBS value of the plurality of candidate TBS values may be determined based on a mapping between the first candidate TBS value and the second candidate TBS value. For example, when the TBS value or index $X_2$ and/or $X_3$ is no more than $\frac{1}{2} * X_0$, the number of PRBs/RUs/subcarriers assigned for $X_2$ and/or $X_3$ may be the largest value within the set $\{1, 2, 3, 4, 5, 6, 8, 10\}$ which is smaller than that indicated for $X_0$, or may be the largest value within the set $\{1, 2, 3, 4, 5, 6, 8, 10\}$ which is no more than half of the number of PRBs/RUs/subcarriers indicated for $X_0$.

In some embodiments, in the NB-IoT system, in cases where the number of RUs for $X_0$ is not indicated by the UL grant in the RAR, e.g. the number of RUs for $X_0$ is semi-statically configured or predefined in spec, or in cases where less than 3 bits are used for the indication of number of RUs for $X_0$, N bits out of 3 bits in the MCS/TBS indication field or the reserved states in this field may be used for indication of the number of RUs for $X_1$, $X_2$ and/or $X_3$. In cases where the smaller number of RUs are allocated only for $X_2$ and/or $X_3$, the allocated number of RUs for other candidate TBS value(s) (e.g. $X_1$) would follow that for $X_0$. For example, the reserved bit 'R' in RAR may be used to indicate whether the UL grant is for EDT or not, 2 bits may be used to indicate modulation scheme and number of RUs for $X_0$, and remaining 1 bit in the MCS/TBS indication field may be used to indicate whether a smaller number of RUs to be used for the candidate TBS values smaller than $X_0$, e.g. for $X_2$ and/or $X_3$. As another example, no reserved bit 'R' is used, while 5 reserved states may be used to indicate the combination of number of RUs for $X_0$ and whether a predefined smaller number of RUs to be allocated for other candidate TBS values.

In some embodiments, in the eMTC system, the MCS/TBS indication field may be used to indicate the number of PRBs for other candidate TBS values, for example, in cases where the number of RUs for $X_0$ is not indicated by the UL grant in the RAR. For example, N bits out of 3 bits in CE mode A and M bits out of 2 bits in CE mode B may be used to indicate the number of PRBs allocated for the candidate TBS values other than $X_0$. In one example, N and M may be equal to 1 to indicate whether a predefined smaller number of PRBs (e.g. the PRBs allocated for $X_0$ except ending K PRBs, e.g. K=1 or 2) to be allocated for $X_1$, $X_2$ and/or $X_3$. In cases where the smaller number of PRBs are allocated only for $X_2$ and/or $X_3$, the number of PRBs for other candidate TBS values (e.g. $X_1$) would follow that for $X_0$.

Method to Indicate the Number of Repetitions for Different TBS Values

In some embodiments, the number of repetitions for Msg3 with EDT may be indicated by the repetition number field in the UL grant in RAR as in legacy eMTC/NB-IoT systems. In some embodiments, the same number of repetitions may be used for all candidate TBSs to be selected by the UE. Alternatively, in some embodiments, the number of repetitions for Msg3 with EDT may be different for different candidate TBS values.

In some embodiments, the number of repetitions for Msg3 with EDT indicated by the repetition number field may be determined as that for the largest candidate TBS value $X_0$ of the plurality of candidate TBS values. In some embodiments, the number of repetitions for another candidate TBS value of the plurality of candidate TBS values may be determined based on a mapping between the number of repetitions for the largest candidate TBS value and the number of repetitions for the another candidate TBS value. For example, when the TBS value or index $X_2$ and/or $X_3$ is no more than $\frac{1}{2}*X_0$, the number of repetitions assigned for $X_2$ and/or $X_3$ may be the largest value within a set of supported repetition numbers that is smaller than the number of repetitions indicated for $X_0$. Alternatively, RRC signaling may be used to indicate the number of repetitions for certain TBS values or indexes. For example, the mapping (e.g. a scaling factor) from the number of repetitions for the largest candidate TBS value to the number of repetitions for other smaller candidate TBS values may be indicated by e.g., the RRC signaling.

In some embodiments, the number of repetitions (or scaling factors) for the candidate TBS values is determined based on the maximum TBS value configured by the AN. For a certain maximum TBS value, there is a mapping between the number of repetitions indicated by the repetition number field and each of the plurality of candidate TBS values. In an embodiment, the mapping may include one or more sets of scaling factors for the number of repetitions for the plurality of candidate TBS value with respect to the number of repetitions indicated by the repetition number field. For example, the scaling factors may be selected from $\{3/8, 1/2, 5/8, 3/4, 7/8, 1\}$. Table 10 and Table 11 provide some examples of the set of scaling factors for the eMTC system and the NB-IoT system, respectively. For example, $X_0 > X_1 > X_2 > X_3$, and they correspond to the up to four candidate TBS values. Other mappings from the maximum TBS value to different sets of scaling factors are possible. The embodiments are not limited in this respect.

TABLE 10

Example of sets of scaling factor for number of repetitions corresponding to maximum

| Max TBS | Set 1 of scaling factors for $X_3$, $X_2$, $X_1$, $X_0$ | Set 2 of scaling factors for $X_3$, $X_2$, $X_1$, $X_0$ |
|---|---|---|
| 328 | {1} | {1} |
| 408 | {7/8, 1} | {3/4, 1} |
| 456 | {3/4, 1, 1} | {3/4, 7/8, 1} |
| 504 | {3/4, 7/8, 1, 1} | {5/8, 3/4, 7/8, 1} |
| 600 | {5/8, 3/4, 7/8, 1} | {1/2, 5/8, 7/8, 1} |
| 712 | {1/2, 3/4, 7/8, 1} | {1/2, 5/8, 7/8, 1} |
| 808 | {1/2, 5/8, 1, 1} | {3/8, 5/8, 7/8, 1} |
| 936 | {3/8, 5/8, 7/8, 1} | {3/8, 1/2, 3/4, 1} |
| 1000 | {3/8, 5/8, 7/8, 1} | {3/8, 1/2, 3/4, 1} |

TABLE 11

Example of sets of scaling factor for number of repetitions corresponding to maximum TBS value for NB-IoT TBS value for eMTC

| Max TBS | Set of scaling factors for $X_3$, $X_2$, $X_1$, $X_0$ |
|---|---|
| 328 | {1} |
| 408 | {7/8, 1} |
| 504 | {3/4, 7/8, 1} |
| 584 | {5/8, 3/4, 7/8, 1} |
| 680 | {1/2, 3/4, 7/8, 1} |
| 808 | {1/2, 5/8, 7/8, 1} |
| 936 | {3/8, 5/8, 7/8, 1} |
| 1000 | {3/8, 5/8, 7/8, 1} |

In some embodiments, more than one sets of scaling factors are configured for a certain maximum TBS value, then which set of scaling factors to be used is indicated by higher layer signaling or the UL grant, e.g., the MCS/TBS indication field (in particular for the eMTC system). In some embodiments, only one set of scaling factors is predefined for a certain maximum TBS value. In some embodiments, more than one sets of scaling factors are configured for a certain maximum TBS value, then which set of scaling factors to be used is indicated by higher layer signaling or the UL grant, e.g., the MCS/TBS indication field (in particular for the eMTC system). In some embodiments, only one set of scaling factors is predefined for a certain maximum TBS value. For example, the scaling factor for one of candidate TBS values is denoted by $\alpha$, the number of repetitions used for the candidate TBS value may be calculated by ceil(α*R). Here, R is the number of repetitions indicated by the UL grant. Alternatively, the number of repetitions may be a value selected from a predefined set, which is closest to ceil(α*R). For example, the predefined set may be the same as the number of repetitions supported in legacy eMTC/NB-IoT systems, e.g. {1, 2, 4, 8, 16, 32, 64, 128, 192, 256, 384, 512, 768, 1024, 1536, 2048} for the eMTC system and {1, 2, 4, 8, 16, 32, 64, 128} for the NB-IoT system. In an embodiment, all values which are multiples of 4 or 8 may be included in the predefined set. For example, the number of repetitions may be calculated by ceil(α*R/x)*x. Here, x may be any integer such as 4 or 8. For another example, the number of repetitions may be calculated by $$\begin{cases} 1, & \text{if } \alpha * R \leq 1; \\ 2, & \text{if } 1 < \alpha * R \leq 2 \\ \text{ceil}(\alpha * R / 4) * 4, & \text{otherwise} \end{cases} \quad \text{with } x = 4, \text{ or}$$

$$\begin{cases} 1, & \text{if } \alpha * R \leq 1; \\ 2, & \text{if } 1 < \alpha * R \leq 2 \\ 4, & \text{if } 2 < \alpha * R \leq 4 \\ \text{ceil}(\alpha * R / 8) * 8, & \text{otherwise} \end{cases} \quad \text{with } x = 8.$$

In an embodiment, the maximum TBS value is used as the largest candidate TBS value $X_0$ and the selected TBS value is $X_i$, then the scaling factors may be $X_i/X_0$. As repetitions helps improve the received signal noise ratio (SNR), in another embodiment, the scaling factors may be $\log(X_i/X_0)$. Other scaling factors are possible. The embodiments are not limited in this respect.

In some embodiments, the smaller candidate TBS values (e.g., $X_1$, $X_2$ and/or $X_3$) may be determined based on a portion of bits in the MCS/TBS indication field of the UL grant or a portion of states indicated by the MCS/TBS indication field. For example, N bits out of 3 bits in CE mode A and M bits out of 2 bits in CE mode B may be used to indicate the number of repetitions allocated for the smaller candidate TBS values (e.g., $X_1$, $X_2$ and/or $X_3$). In one example, N and/or M may be equal to 1, that is, one bit in the MCS/TBS indication field indicates whether a predefined smaller number of repetitions (e.g. the largest supported number of repetitions that is smaller than the number of repetitions indicated by the UL grant or the number of repetitions configured by RRC signaling for smaller candidate TBS values) to be allocated for $X_1$, $X_2$ and/or $X_3$. In cases the smaller number of repetitions are allocated only for $X_2$ and/or $X_3$, the number of repetitions for other candidate TBS(s) (e.g. $X_1$) would follow the number of repetitions for $X_0$.

Indication of Selected TBS Among the Up to 4 Possible Values

The UE may determine a plurality of candidate TBS values to be selected by the UE, as mentioned above. The AN needs to blindly detect which TBS among the e.g., up to 4 candidate TBS values is selected by the UE. If an initial transmission of the Msg3 is not detected successfully, the AN may still reserve the same amount of resources for retransmission of the Msg3, even though the number of repetitions needed may be smaller than the indicated one when the UE selects a smaller TBS. Thus, the resources not used by the retransmission would be wasted. To resolve this issue, indication for selected TBS, which is independently detectable from actual data transmission, is supported. How to inform the AN about the target TBS value selected by the UE will be described below.

In some embodiments, an indicator configured to indicate a target TBS value selected by the UE may be included in the Msg3 with EDT. The indicator may include one or more bits. In an embodiment, the indicator includes two bits. Alternatively, in an embodiment, the number of bits for the indicator depends on the maximum TBS value, for example, 1 or 2 bits may be supported. For example, 1 bit is used when the maximum TBS value is no more than 408 bits, while 2 bits are used for other cases. As another example, 1 bit is always used for the NB-IoT system, as the supported number of repetitions that can be scheduled by the UL grant is restricted to set {1, 2, 4, 8, 16, 32, 64, 128} and 1 bit is sufficient to indicate whether the selected TBS value is no more than ½ of the maximum TBS value.

In some embodiments, the indicator is piggybacked following uplink control information (UCI) on PUSCH, as the legacy LTE system. The mapping for the indicator may follow the resource element mapping for HARQ-ACK information, or channel status information (CSI) information or scheduling request (SR) information.

In some embodiments, the indicator may be carried only in the initial transmission of the Msg3. In an embodiment, the indicator is carried in first M subframes for the initial transmission. M is a positive integer, for example, the indicator may be carried only in the first one subframe. M may be determined based on at least one of predefinition, higher layer signaling (e.g., the RRC signaling), the number of repetitions of the initial transmission indicated by the AN (e.g., a mapping from the number of repetitions of the initial transmission indicated by the AN), a maximum TBS value configured by the AN, and the number of subframes for the maximum TBS value. For example, M may be determined by ceil(β*T), where β depends on the maximum TBS value and T is the number of subframes indicated by the UL grant for the maximum TBS value. The transmission mechanism may follow PUCCH for the eMTC system and NPUSCH format 2 for the NB-IoT system. For the NB-IoT system, the M subframes may be multiple of RUs where RU may reuse the concept defined for NPUSCH format 2 in Rel-13 NB-IoT.

Alternatively, in some embodiments, the indicator may be carried in each of the initial transmission of the Msg3 and one or more of repetitions of the initial transmission. In an embodiment, the indicator may be carried in first one or more repetitions. In an embodiment, the indicator may be carried in first M subframes for each of the initial transmission and the one or more repetitions. M is a positive integer and may be determined as above. The number of the one or more repetitions to carry the indicator is determined based on at least one of predefinition, higher layer signaling (e.g., the RRC signaling), the number of repetitions of the initial transmission to be used for the smallest TBS value available to the UE, a maximum TBS value configured by the AN, and the number of repetitions of the initial transmission indicated by the AN. In an example, the number of repetitions to carry the indicator is based on a mapping from the indicated number of repetitions indicated by the UL grant. In an example, the number of repetitions to carry the indicator may be equal to the number of repetitions to be used for the smallest candidate TBS value selectable to the UE. In an example, the number of repetitions to carry the indicator may be determined by ceil(β*R), where β is based on the maximum TBS value and R is the number of repetitions indicated by the UL grant.

In some embodiments, the indicator may be carried in first one or more symbols within each of one or more subframes. In some embodiments, the one or more subframes may include a subframe for a repetition of the initial transmission of the Msg3. In other words, the indicator may be carried in one or more symbols for the initial transmission only, in one or more symbols for one or more repetition of the initial transmission only, or in one or more symbols for both.

In some embodiments, the frequency domain resources used for the indicator transmission may be the same as that used for other data transmission. Either time-first or frequency first mapping may be used for the resource element mapping for the indicator. If time-first mapping is used, the bits of indicator are mapped to up to the one or more symbols used to carry the indicator one subcarrier by one subcarrier.

In some embodiments, the indicator may be carried in a demodulation reference signal (DMRS). For example, a phase may be added to the DMRS symbols. For a 1-bit indicator, DMRS may be multiplied by −1 or 1 to carry the 1-bit indicator.

In some embodiments, if the AN fails to detect the indicator for the selected TBS value, the AN may still allocate the same amount of resources for a retransmission as that for the initial transmission.

In some cases, the indicator is detected incorrectly and allocated resources by the AN for the retransmission are different from that used by the UE for the initial transmission. In an embodiment, the UE may follow the resource allocation indicated by the UL grant scheduling the retransmission. In another embodiment, the UE may use the same amount of resources for the retransmission as that for the initial transmission, when the amount of resources for the retransmission indicated by the AN is larger than the amount of resources used by the UE for the initial transmission. For example, the number of repetitions used by the UE for initial transmission is $R_0$, however, the AN incorrectly detects the selected TBS value and schedules the number of repetitions $R_1$ with $R_0 < R_1$. In this case, the UE may still use $R_0$ repetitions for the retransmission. As another example, the AN may not be able to schedule $R_0$ repetitions due to that $R_0$ does not belong to the set of supported number of repetitions that can be scheduled by the UL grant. In this case, the AN may schedule the number of repetitions that is larger than $R_0$, and may assume that UE would use $R_0$ repetitions instead of the scheduled one based on the detected indicator.

Below, two embodiments are provided to illustrate design of EDT of the present disclosure.

In an embodiment for an eMTC system, the reserved bit 'R' is used to indicate whether the UL grant is for scheduling of legacy Msg3 without EDT or Msg3 with EDT. When the UL grant is used for scheduling of EDT, the frequency domain resource allocation is indicated by the UL grant as in legacy eMTC, which is used for all candidate TBS values.

The largest candidate TBS value among the up to 4 candidate TBS values may be determined by the largest one of a plurality of TBS values corresponding to the allocated number of PRBs in Table 7.1.7.2.1-1 in 36.213. The determined largest candidate TBS value is no more than the maximum TBS value broadcasted by the system information. For the other up to three candidate TBS values, a predefined mapping from the largest candidate TBS value may be defined. For example, denoting the TBS index for the largest candidate TBS value by $I_0$, the other up to three candidate TBS indices may be obtained by $\mathrm{ceil}(I_0 * 3/4)$, $\mathrm{ceil}(I_0/2)$ and/or $\mathrm{ceil}(I_0/4)$ whichever provide the candidate TBS values larger than the minimum TBS values supported for EDT (which is about 320 bits as agreed in RAN2).

The modulation scheme and/or coding rate may be determined according to the TBS index, by reading the MCS index table defined in a legacy eMTC.

For the number of repetitions, the number of repetitions indicated by the UL grant as in legacy eMTC may be assigned for the largest candidate TBS value among the up to 4 candidate TBS values. N bit(s) out of 3 bits in the MCS/TBS indication field for CE mode A and M bit(s) out of 2 bits in the MCS/TBS indication field for CE mode B may be used to indicate the number of repetitions for other smaller candidate TBS values. For example, 1 bit may be used to indicate whether the number of repetitions for the smallest one or two candidate TBS values may be the value smaller than the number of repetitions indicated for the largest candidate TBS value. For example, in cases where there are 4 candidate TBS values to be selected by the UE, the 1 bit may be used to indicate whether the number of repetitions smaller than the value indicated for largest candidate TBS value may be allocated for the smallest two candidate TBS values. As another example, in cases where there are 2 or 3 candidate TBS values to be selected by the UE, the 1 bit may be used to indicate whether the number of repetitions smaller than the value indicated for the largest candidate TBS value may be allocated for the smallest candidate TBS value. Alternatively, 2 bits may be used to indicate whether the smaller number of repetitions may be used for the following cases: the other up to 3 smaller candidate TBS values, the smallest 2 candidate TBS values, the smallest candidate TBS value, or not be used for all candidate TBS values. The smaller number of repetitions may be the largest one within the set of supported repetition numbers that is smaller than the value for the maximum TBS value.

In another embodiment for a NB-IoT system, no reserved bit is used. The 5 reserved states in the MCS/TBS indication field may be used to differentiate the UL grant for scheduling of Msg3 with EDT and Msg3 without EDT.

When the UL grant is used for scheduling of EDT, the subcarrier allocation is indicated by the UL grant as in a legacy NB-IoT, which may be used for all candidate TBS values.

The number of RUs is indicated by the MCS/TBS indication field in UL grant, using the 5 reserved states. K out of 5 states may be used to indicate that the number of RUs for other smaller candidate TBS values are smaller than the number of RUs assigned for the largest candidate TBS value. For example, 3 states may be defined to indicate 3 possible number of RUs, which applies to all candidate TBS values. The other 2 states may be defined to indicate relatively large number of RUs which only applies to certain candidate TBS values (e.g. $X_0$ and $X_1$). The number of RUs for other candidate TBS values (e.g. $X_2$ and $X_3$) may be the largest values within the set {1, 2, 3, 4, 5, 6, 8, 10} each of which is smaller than the indicated number of RUs for maximum TBS value.

The largest candidate TBS value among the up to 4 candidate TBS values may be determined by the largest one of a plurality of TBS values corresponding to the allocated number of RUs in Table 16.5.1.2-2 in 36.213 which is no more than the maximum TBS value broadcasted by the system information. For the other up to three candidate TBS values, a predefined mapping from the largest candidate TBS value may be defined. For example, denoting the TBS index for the largest candidate TBS value by $I_0$, the other up to three TBS indices may be obtained by $\mathrm{ceil}(I_0 * 3/4)$, ceil ($I_0/2$) and/or ceil($I_0/4$) whichever provide the TBS values larger than the minimum TBS values supported for EDT (which is about 320 bits as agreed in RAN2).

The modulation/coding scheme may be determined according to the TBS index, by reading the MCS index table defined in legacy NPUSCH (e.g. table 16.5.1.2-1 in 36.213 can be used when single-tone Msg3 is scheduled while QPSK is used when multi-tone Msg3 is scheduled). Alternatively, for single-tone Msg3, pi/2-BPSK is used when TBS of 328 bits and RU index of 6 or 7 (i.e., 8 or 10 RUs) are selected, while pi/4-QPSK is used for other single-tone Msg3 transmission. As another example, pi/2-BPSK is used when TBS of 328 bits and RU index of 6 or 7, or TBS of 408 bits and RU index of 6 are selected, while pi/4-QPSK is used for other single-tone Msg3 transmission. In yet another example, only pi/4-QPSK is used for single-tone Msg3 transmission with EDT.

The number of repetitions indicated by the UL grant as in the legacy NB-IoT. The same number of repetitions may be used for all candidate TBS values.

The two embodiments above are only for purpose of illustration, but not limitation. The features of the two embodiments may be combined with those in any other embodiments of the present disclosure. The embodiments are not limited in this respect.

Figure 3:
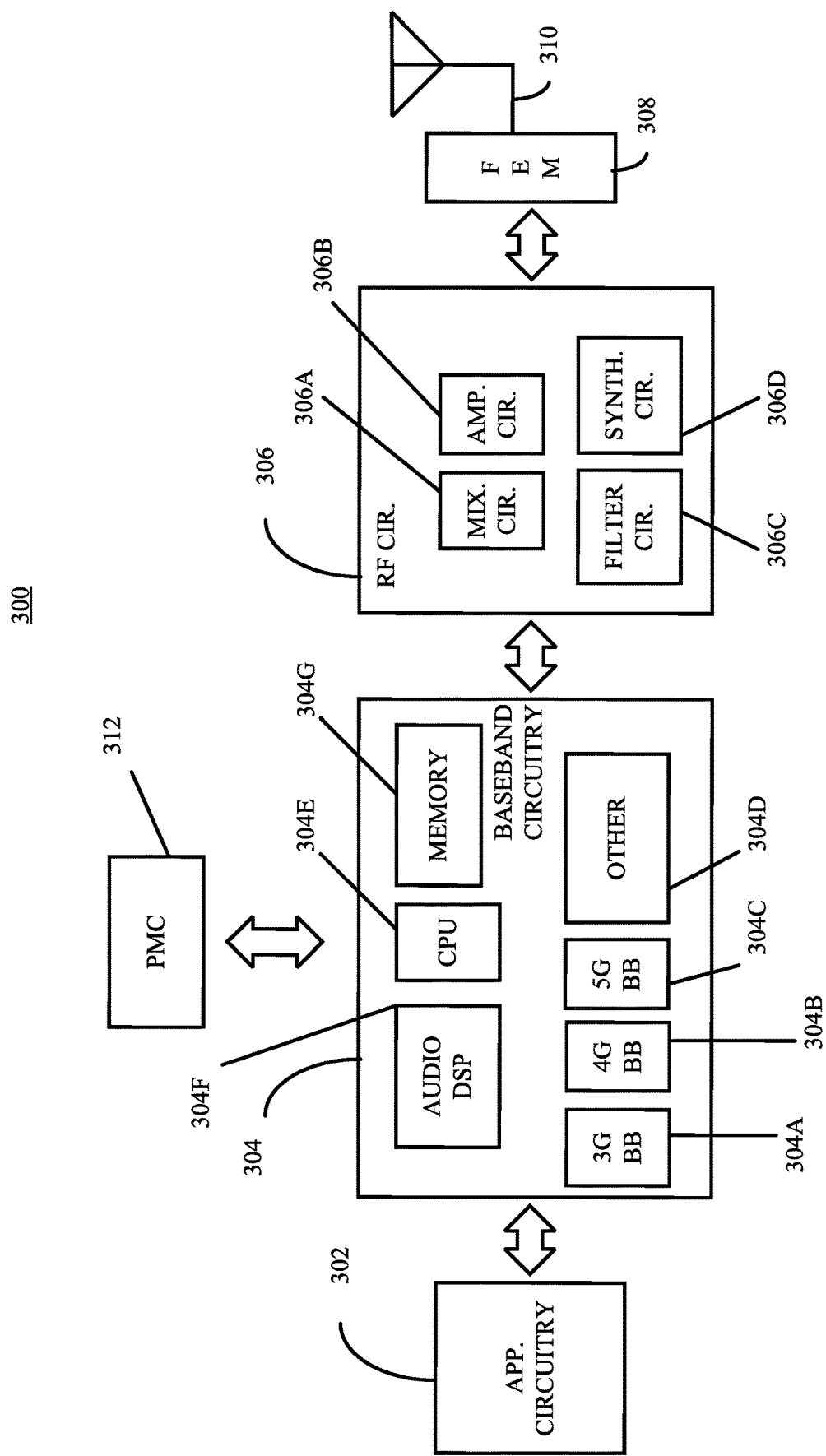
FIG. 3 illustrates example components of a device in accordance with some embodiments of the disclosure.

FIG. 3 illustrates example components of a device 300 in accordance with some embodiments. In some embodiments, the device 300 may include application circuitry 302, baseband circuitry 304, Radio Frequency (RF) circuitry 306, front-end module (FEM) circuitry 308, one or more antennas 310, and power management circuitry (PMC) 312 coupled together at least as shown. The components of the illustrated device 300 may be included in a UE or an AN. In some embodiments, the device 300 may include less elements (e.g., an AN may not utilize application circuitry 302, and instead include a processor/controller to process IP data received from an EPC). In some embodiments, the device 300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 302 may include one or more application processors. For example, the application circuitry 302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 300. In some embodiments, processors of application circuitry 302 may process IP data packets received from an EPC.

The baseband circuitry 304 may include circuitry such as, but not limited to, one or more single-core or multi-core processors. The baseband circuitry 304 may include one or more baseband processors or control logic to process baseband signals received from a receive signal path of the RF circuitry 306 and to generate baseband signals for a transmit signal path of the RF circuitry 306. Baseband processing circuitry 304 may interface with the application circuitry 302 for generation and processing of the baseband signals and for controlling operations of the RF circuitry 306. For example, in some embodiments, the baseband circuitry 304 may include a third generation (3G) baseband processor 304A, a fourth generation (4G) baseband processor 304B, a fifth generation (5G) baseband processor 304C, or other baseband processor(s) 304D for other existing generations, generations in development or to be developed in the future (e.g., second generation (2G), sixth generation (6G), etc.). The baseband circuitry 304 (e.g., one or more of baseband processors 304A-D) may handle various radio control functions that enable communication with one or more radio networks via the RF circuitry 306. In other embodiments, some or all of the functionality of baseband processors 304A-D may be included in modules stored in the memory 304G and executed via a Central Processing Unit (CPU) 304E. The radio control functions may include, but are not limited to, signal modulation/demodulation, encoding/decoding, radio frequency shifting, etc. In some embodiments, modulation/demodulation circuitry of the baseband circuitry 304 may include Fast-Fourier Transform (FFT), precoding, or constellation mapping/demapping functionality. In some embodiments, encoding/decoding circuitry of the baseband circuitry 304 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 304 may include one or more audio digital signal processor(s) (DSP) 304F. The audio DSP(s) 304F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 304 and the application circuitry 302 may be implemented together such as, for example, on a system on a chip (SOC).

In some embodiments, the baseband circuitry 304 may provide for communication compatible with one or more radio technologies. For example, in some embodiments, the baseband circuitry 304 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 304 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RF circuitry 306 may include switches, filters, amplifiers, etc. to facilitate the communication with the wireless network. RF circuitry 306 may include a receive signal path which may include circuitry to down-convert RF signals received from the FEM circuitry 308 and provide baseband signals to the baseband circuitry 304. RF circuitry 306 may also include a transmit signal path which may include circuitry to up-convert baseband signals provided by the baseband circuitry 304 and provide RF output signals to the FEM circuitry 308 for transmission.

In some embodiments, the receive signal path of the RF circuitry 306 may include mixer circuitry 306a, amplifier circuitry 306b and filter circuitry 306c. In some embodiments, the transmit signal path of the RF circuitry 306 may include filter circuitry 306c and mixer circuitry 306a. RF circuitry 306 may also include synthesizer circuitry 306d for synthesizing a frequency for use by the mixer circuitry 306a of the receive signal path and the transmit signal path. In some embodiments, the mixer circuitry 306a of the receive signal path may be configured to down-convert RF signals received from the FEM circuitry 308 based on the synthesized frequency provided by synthesizer circuitry 306d. The amplifier circuitry 306b may be configured to amplify the down-converted signals and the filter circuitry 306c may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals, although this is not a requirement. In some embodiments, mixer circuitry 306a of the receive signal path may comprise passive mixers, although the scope of the embodiments is not limited in this respect.

In some embodiments, the mixer circuitry 306a of the transmit signal path may be configured to up-convert input baseband signals based on the synthesized frequency provided by the synthesizer circuitry 306d to generate RF output signals for the FEM circuitry 308. The baseband signals may be provided by the baseband circuitry 304 and may be filtered by filter circuitry 306c.

In some embodiments, the mixer circuitry 306a of the receive signal path and the mixer circuitry 306a of the transmit signal path may include two or more mixers and may be arranged for quadrature downconversion and upconversion, respectively. In some embodiments, the mixer circuitry 306a of the receive signal path and the mixer circuitry 306a of the transmit signal path may include two or more mixers and may be arranged for image rejection (e.g., Hartley image rejection). In some embodiments, the mixer circuitry 306a of the receive signal path and the mixer circuitry 306a may be arranged for direct downconversion and direct upconversion, respectively. In some embodiments, the mixer circuitry 306a of the receive signal path and the mixer circuitry 306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 304 may include a digital baseband interface to communicate with the RF circuitry 306.

In some dual-mode embodiments, a separate radio IC circuitry may be provided for processing signals for each spectrum, although the scope of the embodiments is not limited in this respect.

In some embodiments, the synthesizer circuitry 306d may be a fractional-N synthesizer or a fractional N/N+1 synthesizer, although the scope of the embodiments is not limited in this respect as other types of frequency synthesizers may be suitable. For example, synthesizer circuitry 306d may be a delta-sigma synthesizer, a frequency multiplier, or a synthesizer comprising a phase-locked loop with a frequency divider.

The synthesizer circuitry 306d may be configured to synthesize an output frequency for use by the mixer circuitry 306a of the RF circuitry 306 based on a frequency input and a divider control input. In some embodiments, the synthesizer circuitry 306d may be a fractional N/N+1 synthesizer.

In some embodiments, frequency input may be provided by a voltage controlled oscillator (VCO), although that is not a requirement. Divider control input may be provided by either the baseband circuitry 304 or the applications processor 302 depending on the desired output frequency. In some embodiments, a divider control input (e.g., N) may be determined from a look-up table based on a channel indicated by the applications processor 302.

Synthesizer circuitry 306d of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 306 may include an IQ/polar converter.

FEM circuitry 308 may include a receive signal path which may include circuitry configured to operate on RF signals received from one or more antennas 310, amplify the received signals and provide the amplified versions of the received signals to the RF circuitry 306 for further processing. FEM circuitry 308 may also include a transmit signal path which may include circuitry configured to amplify signals for transmission provided by the RF circuitry 306 for transmission by one or more of the one or more antennas 310. In various embodiments, the amplification through the transmit or receive signal paths may be done solely in the RF circuitry 306, solely in the FEM 308, or in both the RF circuitry 306 and the FEM 308.

In some embodiments, the FEM circuitry 308 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 306). The transmit signal path of the FEM circuitry 308 may include a power amplifier (PA) to amplify input RF signals (e.g., provided by RF circuitry 306), and one or more filters to generate RF signals for subsequent transmission (e.g., by one or more of the one or more antennas 310).

In some embodiments, the PMC 312 may manage power provided to the baseband circuitry 304. In particular, the PMC 312 may control power-source selection, voltage scaling, battery charging, or DC-to-DC conversion. The PMC 312 may often be included when the device 300 is capable of being powered by a battery, for example, when the device is included in a UE. The PMC 312 may increase the power conversion efficiency while providing desirable implementation size and heat dissipation characteristics.

While FIG. 3 shows the PMC 312 coupled only with the baseband circuitry 304. However, in other embodiments, the PMC 312 may be additionally or alternatively coupled with, and perform similar power management operations for, other components such as, but not limited to, application circuitry 302, RF circuitry 306, or FEM 308.

In some embodiments, the PMC 312 may control, or otherwise be part of, various power saving mechanisms of the device 300. For example, if the device 300 is in an RRC_Connected state, where it is still connected to the RAN node as it expects to receive traffic shortly, then it may enter a state known as Discontinuous Reception Mode (DRX) after a period of inactivity. During this state, the device 300 may power down for brief intervals of time and thus save power.

If there is no data traffic activity for an extended period of time, then the device 300 may transition off to an RRC_Idle state, where it disconnects from the network and does not perform operations such as channel quality feedback, handover, etc. The device 300 goes into a very low power state and it performs paging where again it periodically wakes up to listen to the network and then powers down again. The device 300 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 302 and processors of the baseband circuitry 304 may be used to execute elements of one or more instances of a protocol stack. For example, processors of the baseband circuitry 304, alone or in combination, may be used execute Layer 3, Layer 2, or Layer 1 functionality, while processors of the application circuitry 304 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer. As referred to herein, Layer 2 may comprise a medium access control (MAC) layer, a radio link control (RLC) layer, and a packet data convergence protocol (PDCP) layer. As referred to herein, Layer 1 may comprise a physical (PHY) layer of a UE/RAN node.

Figure 4:
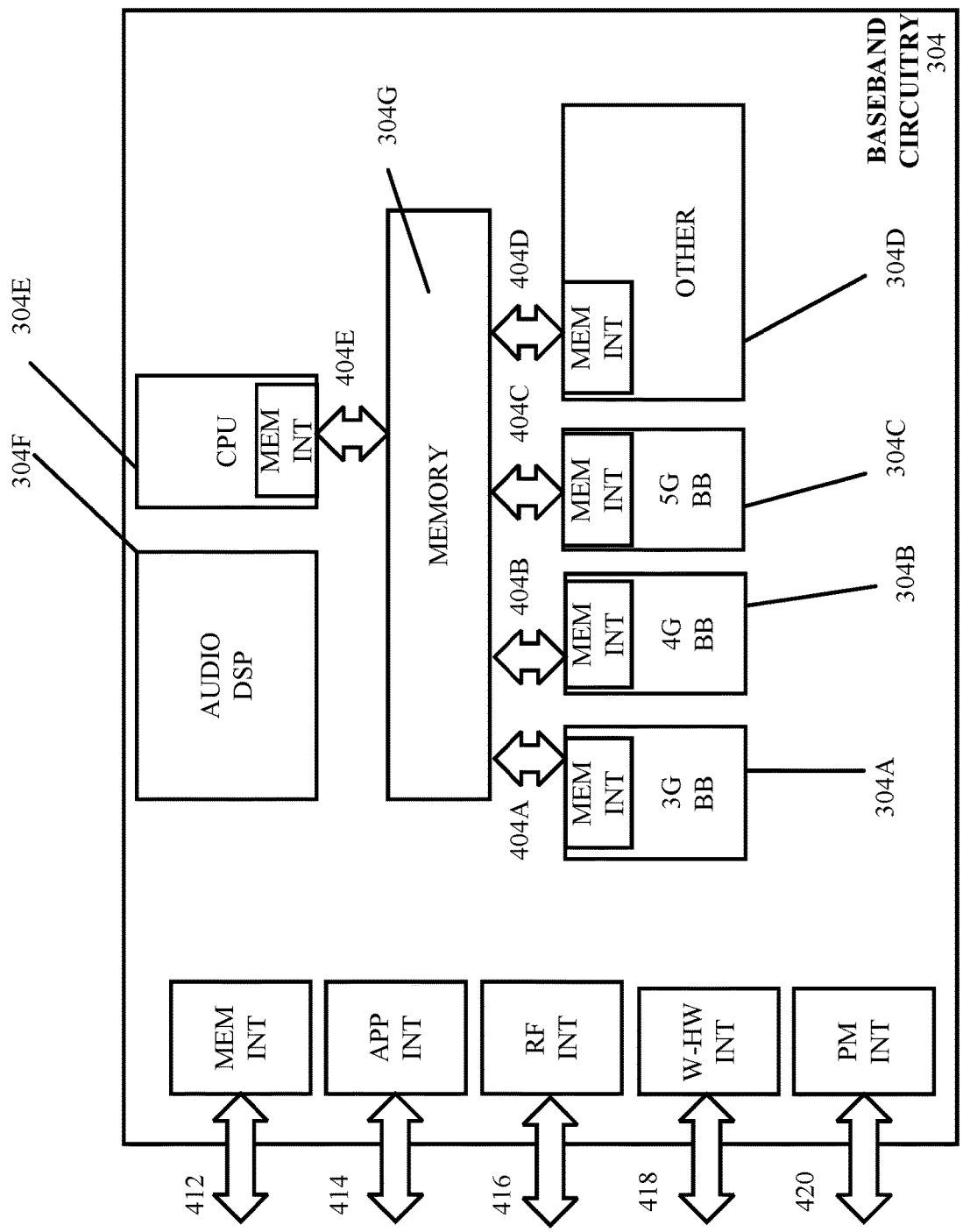
FIG. 4 illustrates example interfaces of baseband circuitry in accordance with some embodiments.

FIG. 4 illustrates example interfaces of baseband circuitry in accordance with some embodiments. As discussed above, the baseband circuitry 304 of FIG. 3 may comprise processors 304A-304E and a memory 304G utilized by said processors. Each of the processors 304A-304E may include a memory interface, 404A-404E, respectively, to send/receive data to/from the memory 304G.

The baseband circuitry 304 may further include one or more interfaces to communicatively couple to other circuitries/devices, such as a memory interface 412 (e.g., an interface to send/receive data to/from memory external to the baseband circuitry 304), an application circuitry interface 414 (e.g., an interface to send/receive data to/from the application circuitry 302 of FIG. 3), an RF circuitry interface 416 (e.g., an interface to send/receive data to/from RF circuitry 306 of FIG. 3), a wireless hardware connectivity interface 418 (e.g., an interface to send/receive data to/from Near Field Communication (NFC) components, Bluetooth® components (e.g., Bluetooth® Low Energy), Wi-Fi® components, and other communication components), and a power management interface 420 (e.g., an interface to send/receive power or control signals to/from the PMC 312.

Figure 5:
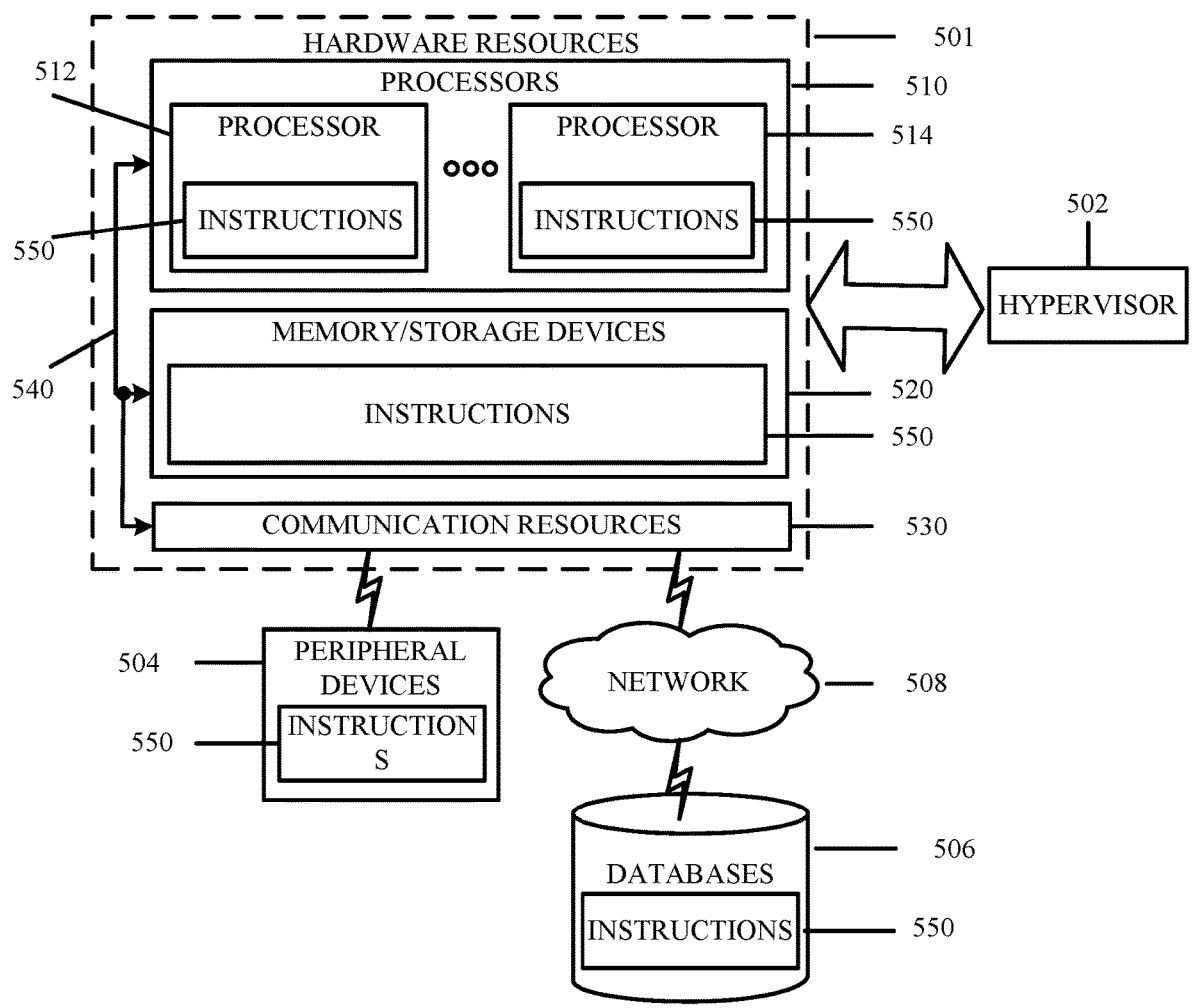
FIG. 5 is a block diagram illustrating components, according to some example embodiments, able to read instructions from a machine-readable or computer-readable medium and perform any one or more of the methodologies discussed herein.

FIG. 5 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 5 shows a diagrammatic representation of hardware resources 500 including one or more processors (or processor cores) 510, one or more memory/storage devices 520, and one or more communication resources 530, each of which may be communicatively coupled via a bus 540. For embodiments where node virtualization (e.g., NFV) is utilized, a hypervisor 502 may be executed to provide an execution environment for one or more network slices/sub-slices to utilize the hardware resources 500.

The processors 510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 512 and a processor 514.

The memory/storage devices 520 may include main memory, disk storage, or any suitable combination thereof. The memory/storage devices 520 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 530 may include interconnection or network interface components or other suitable devices to communicate with one or more peripheral devices 504 or one or more databases 506 via a network 508. For example, the communication resources 530 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 550 may comprise software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the peripheral devices 504 or the databases 506. Accordingly, the memory of processors 510, the memory/storage devices 520, the peripheral devices 504, and the databases 506 are examples of computer-readable and machine-readable media.

The following paragraphs describe examples of various embodiments.

Example 1 includes an apparatus for a user equipment (UE), comprising: a processor configured to: encode a physical random access channel (PRACH) sequence from a plurality of PRACH sequence for transmission via a PRACH to perform a random access procedure, wherein indication of support of early data transmission (EDT) that is transmitted during the random access procedure is based on at least one of the plurality of PRACH sequences, higher layer signaling, PRACH resources, PRACH formats, and a payload from the UE; and send the PRACH sequence to a radio frequency (RF) interface; and the RF interface to receive the PRACH sequence from the processor.

Example 2 includes the apparatus of Example 1, wherein the EDT comprises uplink (UL) transmission and downlink (DL) transmission.

Example 3 includes the apparatus of Example 1, wherein the higher layer signaling comprises at least one of a system information (SI) message and dedicated higher layer signaling.

Example 4 includes the apparatus of Example 1, wherein the EDT is enabled based on coverage enhancement (CE) levels.

Example 5 includes the apparatus of Example 1, wherein the PRACH resources are divided into different partitions, and one or more partitions of the PRACH resources are configured to support the EDT.

Example 6 includes the apparatus of Example 5, wherein the PRACH resources comprise at least one of time resources and frequency resources.

Example 7 includes the apparatus of Example 6, wherein different frequency hopping patterns are configured for different partitions of the PRACH resources.

Example 8 includes the apparatus of Example 1, wherein the plurality of PRACH sequences are divided into different partitions, and one or more partitions of the plurality of PRACH sequences are configured to support the EDT.

Example 9 includes the apparatus of Example 8, wherein the partitions of the plurality of PRACH sequences are divided based on at least one of root indexes and cyclic shifts.

Example 10 includes the apparatus of Example 5 or 8, wherein a number of the partitions of the PRACH resources or a number of the plurality of PRACH sequences is configured to indicate support and/or requirement of multiple transport block size (TBS) values for the EDT.

Example 11 includes the apparatus of Example 5 or 8, wherein the partitions of the PRACH resources or the plurality of PRACH sequences are further divided for different CE levels.

Example 12 includes the apparatus of Example 5 or 8, wherein the partitions of the PRACH resources or PRACH sequences are further divided for UL transmission and DL transmission of the EDT separately or for both of the UL transmission and the DL transmission of the EDT.

Example 13 includes the apparatus of Example 1, wherein the PRACH formats comprises single-tone PRACH and multi-tone PRACH.

Example 14 includes the apparatus of Example 1, wherein the payload from the UE is transmitted following the PRACH sequence to indicate whether the UE supports the EDT or not.

Example 15 includes the apparatus of Example 1, wherein the payload is further configured to indicate a desired TBS value for UL transmission of the EDT.

Example 16 includes an apparatus for a user equipment (UE), comprising: a radio frequency (RF) interface to receive a random access response (RAR) from an access node; and a processor configured to: receive the RAR from the RF interface; decode the RAR to obtain an uplink (UL) grant; and determine whether the UL grant is used for scheduling of early data transmission (EDT) that is transmitted during a random access procedure.

Example 17 includes the apparatus of Example 16, wherein whether the UL grant is used for scheduling of EDT is determined based on an indicator, wherein the indicator is carried via one of an additional bit in the UL grant, a reserved bit in the RAR, an additional bit in the RAR other than the UL grant, a new field in a medium access control (MAC) header for the RAR, and a reserved state indicated by a field of the UL grant.

Example 18 includes the apparatus of Example 17, wherein the UL grant comprises a modulation and coding scheme (MCS)/transport block size (TBS) indication field, wherein the MCS/TBS indication field comprises less bits than that for a random access procedure without EDT.

Example 19 includes the apparatus of Example 17, wherein the UL grant comprises a MCS/TBS indication field, wherein the MCS/TBS indication field comprises more bits than that for a random access procedure without EDT.

Example 20 includes the apparatus of Example 17, wherein the UL grant comprises a MCS/TBS indication field, wherein the MCS/TBS indication field is configured to indicate a combination of a modulation scheme and/or a coding scheme with a TBS value.

Example 21 includes the apparatus of Example 17, wherein the UL grant comprises a physical resource block (PRB) assignment field, wherein the PRB assignment field comprises less bits than that for a random access procedure without EDT.

Example 22 includes the apparatus of Example 17, wherein the UL grant comprises at least one of a UL subcarrier spacing field, a Msg3 subcarrier allocation field, a resource assignment field and a MCS/TBS indication field, and wherein at least one of the UL subcarrier spacing field, the Msg3 subcarrier allocation field, the resource assignment field and the MCS/TBS indication field comprises less bits than that for a random access procedure without EDT.

Example 23 includes the apparatus of Example 17, wherein one of the additional bit in the UL grant, the reserved bit in the RAR, and the additional bit in the RAR other than the UL grant is configured to indicate whether a field in the UL grant is required to be interpreted in a different way from that for a random access procedure without EDT.

Example 24 includes the apparatus of Example 16, wherein the UL grant comprises a second additional bit to indicate offset to a TBS value.

Example 25 includes the apparatus of Example 16, wherein the processor is configured to determine, when the UE transmits a physical random access channel (PRACH) sequence via a PRACH resource that is dedicated for the EDT or the UE transmits a PRACH sequence dedicated for the EDT, that the UL grant is used for scheduling of EDT.

Example 26 includes the apparatus of Example 16, wherein the UL grant has a size that is different from that for a random access procedure without EDT.

Example 27 includes the apparatus of Example 26, wherein the size of the UL grant is indicated by an additional field in a MAC header for the RAR.

Example 28 includes the apparatus of Example 16, wherein the processor is configured to determine that the UL grant is used for scheduling of EDT, wherein the UL grant has a size that is the same as that of an UL grant in the RAR in a random access procedure without EDT.

Example 29 includes the apparatus of Example 16, wherein the UL grant comprises a MCS/TBS indication field, wherein the MCS/TBS indication field is interpreted in a different way from that for a random access procedure without EDT.

Example 30 includes the apparatus of Example 16, wherein the RAR has a RAR format and size that is the same as that for a random access procedure without EDT.

Example 31 includes the apparatus of Example 16, wherein the processor is configured to perform a random access procedure without EDT when determining the UL grant is not used for scheduling of EDT.

Example 32 includes an apparatus for a user equipment (UE), comprising: a processor configured to: determine whether to monitor an explicit acknowledge (ACK) in response to Msg3; and monitor the explicit ACK when it is determined to monitor the explicit ACK; and a radio frequency (RF) interface to: receive the explicit ACK.

Example 33 includes the apparatus of Example 32, wherein whether to monitor the explicit ACK is determined based on at least one of Msg2, predefinition, and a system information (SI) message.

Example 34 includes the apparatus of Example 32, wherein a new radio network temporary identity (RNTI) is defined for physical downlink control channel (PDCCH) for scheduling Msg2, to indicate the explicit ACK.

Example 35 includes the apparatus of Example 32, wherein a temporary cell radio network temporary identity (Temp C-RNTI) is used for PDCCH for scheduling Msg2, to indicate the explicit ACK.

Example 36 includes the apparatus of Example 32, wherein a first unused value or a first reserved state indicated by a field of Msg2 is configured to indicate the explicit ACK.

Example 37 includes the apparatus of Example 32, wherein a second unused value or a second reserved state indicated by a field of Msg2 is configured to indicate the UE to go to an idle mode after successful transmission of Msg3 that comprises early data transmission (EDT).

Example 38 includes the apparatus of Example 32, wherein a third unused value or a third reserved state indicated by a field of Msg2 is configured to indicate the UE to go to an idle mode after successful reception of Msg4 that comprises early data transmission (EDT).

Example 39 includes the apparatus of Example 32, wherein the processor is configured to, after the explicit ACK is received, control the UE to go to an idle mode.

Example 40 includes the apparatus of Example 39, wherein the explicit ACK comprises contention resolution related information.

Example 41 includes the apparatus of Example 32, wherein the processor is configured to, after the explicit ACK is received, control the UE to monitor PDCCH that schedules Msg3 retransmission or Msg4.

Example 42 includes the apparatus of Example 32, wherein the processor is configured to determine, based on Msg2, whether to go to an idle mode or continue to monitor for PDCCH for scheduling of Msg3 retransmission or Msg4 upon reception of the explicit ACK.

Example 43 includes the apparatus of Example 32, wherein the processor is configured to monitor PDCCH that schedules Msg4 or Msg3 retransmission simultaneously with the explicit ACK.

Example 44 includes the apparatus of Example 32, wherein the processor is configured to: monitor the explicit ACK during a monitoring window; and monitor PDCCH that schedules Msg3 retransmission or Msg4 outside the monitoring window.

Example 45 includes an apparatus for a user equipment (UE), comprising: a processor configured to: determine, based on an indicator, whether to allow the UE to go to an idle mode upon expiration of a timer after transmission of an acknowledge (ACK) in response to Msg4; and a radio frequency (RF) interface to: send the ACK to an access node that transmits the Msg4.

Example 46 includes the apparatus of Example 45, wherein the indicator is carried in at least one of a system information (SI) message, Msg2, and physical downlink control channel (PDCCH) that schedules transmission or retransmission of the Msg4.

Example 47 includes the apparatus of Example 45, wherein the timer is predefined or configured by a SI message.

Example 48 includes the apparatus of Example 45, wherein the timer is predefined or configured based on CE levels.

Example 49 includes the apparatus of Example 45, wherein a new radio network temporary identity (RNTI) is defined for physical downlink control channel (PDCCH) that schedules transmission or retransmission of the Msg4 to indicate the UE to go to the idle mode after successful transmission of the ACK for the Msg 4.

Example 50 includes the apparatus of Example 45, wherein an unused value or a reserved state indicated by a field of Msg2 is configured to indicate the UE to go to the idle mode after successful transmission of the ACK for the Msg 4.

Example 51 includes an apparatus for a user equipment (UE), comprising: a processor configured to: determine a first candidate transport block size (TBS) value as the largest candidate TBS value of a plurality of candidate TBS values; and determine, based on the first candidate TBS value, a target TBS value for transmission of Msg3 with early data transmission (EDT) that is transmitted during a random access procedure; and a memory interface to store the first candidate TBS value.

Example 52 includes the apparatus of Example 51, wherein the first candidate TBS value is determined based on a maximum TBS value indicated by a system information (SI) message.

Example 53 includes the apparatus of Example 52, wherein the first candidate TBS value is determined to be equal to the maximum TBS value.

Example 54 includes the apparatus of Example 52, wherein the first candidate TBS value is determined further based on a number of resource allocation units allocated to the UE.

Example 55 includes the apparatus of Example 54, wherein the first candidate TBS value is determined to be a TBS value of a plurality of TBS values corresponding to the allocated number of resource allocation units, wherein the TBS value is the largest one of the plurality of TBS values that is equal to or smaller than the maximum TBS value.

Example 56 includes the apparatus of Example 52, wherein the processor is further configured to: determine a second candidate TBS value of the plurality of candidate TBS values based on a modulation and coding scheme (MCS)/TBS indication field in an UL grant for the Msg3 with EDT, wherein the target TBS value for transmission of the Msg3 with EDT is determined based on both of the first candidate TBS value and the second candidate TBS value.

Example 57 includes the apparatus of Example 56, wherein the processor is further configured to: determine one or more remaining candidate TBS values of the plurality of candidate TBS values based on the first candidate TBS value and the second candidate TBS value, wherein the target TBS value for transmission of the Msg3 with EDT is determined based on the first candidate TBS value, the second candidate TBS value and the one or more remaining candidate TBS values.

Example 58 includes the apparatus of Example 51, wherein the first candidate TBS value is determined based on a MCS/TBS indication field in an uplink (UL) grant for the Msg3 with EDT.

Example 59 includes the apparatus of Example 51, wherein the processor is further configured to: determine one or more remaining candidate TBS values of the plurality of candidate TBS values based on the first candidate TBS value, wherein the one or more remaining candidate TBS values are smaller than the first candidate TBS value, and wherein the target TBS value for transmission of the Msg3 with EDT is determined based on both of the first candidate TBS value and the one or more remaining candidate TBS values.

Example 60 includes the apparatus of Example 59, wherein the one or more remaining candidate TBS values are determined based on a mapping between the first candidate TBS value and the one or more remaining candidate TBS values.

Example 61 includes the apparatus of Example 60, wherein the mapping includes a table indicating the first candidate TBS value and corresponding one or more remaining candidate TBS values.

Example 62 includes the apparatus of Example 60, wherein the mapping includes a function between the first candidate TBS value and the one or more remaining candidate TBS values.

Example 63 includes the apparatus of Example 51, wherein maximum of a number of the plurality of candidate TBS values is 4.

Example 64 includes the apparatus of Example 51, wherein the processor is further configured to use the same frequency domain resource for all of the plurality of candidate TBS values.

Example 65 includes the apparatus of Example 64, wherein the frequency domain resource is indicated by an uplink (UL) grant for the transmission of Msg3 from an access node.

Example 66 includes the apparatus of any of Examples 51 to 65, wherein each of the plurality of candidate TBS values is indicated by a respective TBS index.

Example 67 includes an apparatus for a user equipment (UE), comprising: a radio frequency (RF) interface to: receive a modulation and coding scheme (MCS)/transport block size (TBS) indication field of an uplink (UL) grant or a resource assignment field from an access node; and a processor configured to: receive the MCS/TBS indication field or the resource assignment field from the RF interface; and determine, based on the MCS/TBS indication field or the resource assignment field, a number of resource allocation units for Msg3 with early data transmission (EDT) that is transmitted during a random access procedure.

Example 68 includes the apparatus of Example 67, wherein the number of resource allocation units is determined for all of a plurality of candidate TBS values available to the UE.

Example 69 includes the apparatus of Example 67, wherein the number of resource allocation units is determined for a first candidate TBS value of a plurality of candidate TBS values available to the UE.

Example 70 includes the apparatus of Example 69, wherein the first candidate TBS value is the largest one among the plurality of candidate TBS values.

Example 71 includes the apparatus of Example 69, wherein a number of resource allocation units for a second candidate TBS value of the plurality of candidate TBS values is determined based on a mapping between the first candidate TBS value and the second candidate TBS value.

Example 72 includes the apparatus of Example 69, wherein the number of resource allocation units for the first candidate TBS value is determined based on a first portion of bits in the MCS/TBS indication field.

Example 73 includes the apparatus of Example 72, wherein a number of resource allocation units for a second candidate TBS value of the plurality of candidate TBS values is determined based on a second portion of bits in the MCS/TBS indication field.

Example 74 includes the apparatus of Example 73, wherein the second portion of bits in the MCS/TBS indication field is configured to indicate whether the number of resource allocation units for the second candidate TBS value is equal to a predefined number.

Example 75 includes the apparatus of Example 67, wherein the number of resource allocation units is determined based on a plurality of states indicated by the MCS/TBS indication field.

Example 76 includes the apparatus of Example 75, wherein the number of resource allocation units is determined further based on a maximum TBS value indicated by the access node.

Example 77 includes the apparatus of Example 75, wherein a number of resource allocation units for a first candidate TBS value of a plurality of candidate TBS values available to the UE is determined based on a first portion of the plurality of states indicated by the MCS/TBS indication field.

Example 78 includes the apparatus of Example 77, wherein a number of resource allocation units for a second candidate TBS value of the plurality of candidate TBS values is determined based on a second portion of the plurality of states indicated by the MCS/TBS indication field.

Example 79 includes the apparatus of Example 78, wherein the second portion of the plurality of states indicated by the MCS/TBS indication field is configured to indicate whether the number of resource allocation units for the second candidate TBS value is equal to a predefined number.

Example 80 includes the apparatus of Example 67, wherein the processor is further configured to determine a modulation scheme and/or a coding scheme for the Msg3 based on the MCS/TBS indication field.

Example 81 includes the apparatus of Example 80, wherein the modulation scheme comprises QPSK when the Msg3 is transmitted with a multi-tone mode.

Example 82 includes the apparatus of Example 80, wherein the modulation scheme comprises pi/2 binary phase shift keying (BPSK) and pi/4 quadrature phase shift keying (QPSK) when the Msg3 is transmitted with a single-tone mode.

Example 83 includes the apparatus of Example 82, wherein the pi/4 QPSK is used for the Msg3 transmitted with the single-tone mode irrespective of TBS values and the number of resource allocation units.

Example 84 includes the apparatus of Example 82, wherein selection of the pi/2 BPSK and the pi/4 QPSK is based on TBS values and the number of resource allocation units.

Example 85 includes the apparatus of Example 84, wherein the modulation scheme comprises pi/2 BPSK when TBS value is 328 and the number of resource allocation units is 8 or 10; otherwise the modulation scheme comprises pi/4 QPSK.

Example 86 includes the apparatus of Example 67 to 85, wherein the resource assignment field comprises one of physical resource block (PRB) assignment field and resource unit (RU) assignment field.

Example 87 includes the apparatus of any of Examples 67 to 85, wherein the resource allocation units comprise one of physical resource blocks (PRBs), resource units (RUs), and subcarriers.

Example 88 includes an apparatus for a user equipment (UE), comprising: a processor configured to: decode a repetition number field of an uplink (UL) grant for Msg3 with early data transmission (EDT) that is transmitted during a random access procedure to obtain a number of repetitions indicated by the repetition number field; and determine a number of repetitions for a first candidate transport block size (TBS) value of a plurality of candidate TBS values based on the number of repetitions indicated by the repetition number field; and a memory interface to store the number of repetitions for the first candidate TBS value.

Example 89 includes the apparatus of Example 88, wherein the processor is further configured to determine a number of repetitions for each of the plurality of candidate TBS values to be equal to the number of repetitions indicated by the repetition number field.

Example 90 includes the apparatus of Example 88, wherein the processor is further configured to determine the number of repetitions indicated by the repetition number field as the number of repetitions for the first candidate TBS value.

Example 91 includes the apparatus of Example 90, wherein the first candidate TBS value is the largest one among the plurality of candidate TBS values.

Example 92 includes the apparatus of Example 91, wherein the processor is further configured to determine a number of repetitions for a second candidate TBS value of the plurality of candidate TBS values based on a mapping between the number of repetitions for the first candidate TBS value and the number of repetitions for the second candidate TBS value.

Example 93 includes the apparatus of Example 92, wherein the number of repetitions for the first candidate TBS value is greater than the number of repetitions for the second candidate TBS value.

Example 94 includes the apparatus of Example 90, wherein the processor is further configured to determine a number of repetitions for a second candidate TBS value of the plurality of candidate TBS values based on a portion of bits in a modulation and coding scheme (MCS)/TBS indication field of the UL grant or a portion of states indicated by the MCS/TBS indication field.

Example 95 includes the apparatus of Example 94, wherein the portion of bits in the MCS/TBS indication field or the portion of states indicated by the MCS/TBS indication field is configured to indicate whether the number of repetitions for the second candidate TBS value is equal to a predefined number.

Example 96 includes the apparatus of Example 88, wherein the processor is further configured to determine the number of repetitions for the first candidate TBS value and a number of repetitions for a second candidate TBS value of the plurality of candidate TBS values based on a maximum TBS value configured by an access node serving the UE.

Example 97 includes the apparatus of Example 96, wherein the number of repetitions for the first candidate TBS value and the number of repetitions for the second candidate TBS value are determined further based on a mapping between the number of repetitions indicated by the repetition number field and each of the number of repetitions for the first candidate TBS value and the number of repetitions for the second candidate TBS value.

Example 98 includes the apparatus of Example 97, wherein the mapping comprises one or more sets of scaling factors for the number of repetitions for the first candidate TBS value and the number of repetitions for the second candidate TBS value with respect to the number of repetitions indicated by the repetition number field.

Example 99 includes the apparatus of Example 98, wherein the one or more sets of scaling factors comprise more than one sets of scaling factors, and wherein which set of scaling factors to be used is indicated by higher layer signaling or the UL grant.

Example 100 includes the apparatus of Example 98, wherein the one or more sets of scaling factors comprise one set of scaling factors, and wherein the one set of scaling factors is predefined.

Example 101 includes an apparatus for a user equipment (UE), comprising: a processor configured to: encode an indicator in a Msg3 with early data transmission (EDT) that is transmitted during a random access procedure, wherein the indicator is configured to indicate a target transport block size (TBS) value selected by the UE; and a radio frequency (RF) interface to receive the indicator from the processor.

Example 102 includes the apparatus of Example 101, wherein the indicator comprises one or more bits, and wherein a number of the bits is based on a maximum TBS value configured by an access node serving the UE.

Example 103 includes the apparatus of Example 102, wherein the indicator comprises one bit when the maximum TBS value is equal to or smaller than a threshold, and the indicator comprises two bits when the maximum TBS value is greater than the threshold.

Example 104 includes the apparatus of Example 102, wherein the indicator comprises one bit to indicate whether the selected target TBS value is greater than half of the maximum TBS value.

Example 105 includes the apparatus of Example 101, wherein the indicator comprises two bits.

Example 106 includes the apparatus of Example 101, wherein the indicator is piggybacked following uplink control information (UCI) on physical uplink share channel (PUSCH).

Example 107 includes the apparatus of Example 101, wherein the indicator is carried in an initial transmission of the Msg3.

Example 108 includes the apparatus of Example 107, wherein the indicator is carried in first one or more subframes for the initial transmission.

Example 109 includes the apparatus of Example 101, wherein the indicator is carried in each of an initial transmission of the Msg3 and one or more of repetitions of the initial transmission.

Example 110 includes the apparatus of Example 109, wherein a number of the one or more repetitions to carry the indicator is determined based on at least one of predefinition, higher layer signaling, a number of repetitions of the initial transmission to be used for the smallest TBS value available to the UE, a maximum TBS value configured by an access node serving the UE, and a number of repetitions of the initial transmission indicated by the access node.

Example 111 includes the apparatus of Example 109, wherein the indicator is carried in first one or more subframes for each of the initial transmission and the one or more repetitions.

Example 112 includes the apparatus of Example 108 or 111, wherein a number of the one or more repetitions to carry the indicator is determined based on at least one of predefinition, higher layer signaling, a number of repetitions of the initial transmission indicated by an access node serving the UE, a maximum TBS value configured by the access node, and a number of subframes for the maximum TBS value.

Example 113 includes the apparatus of Example 101, wherein the indicator is carried in first one or more symbols within each of one or more subframes.

Example 114 includes the apparatus of Example 113, wherein the one or more subframes comprise a subframe for a repetition of an initial transmission of the Msg3.

Example 115 includes the apparatus of Example 101, wherein the indicator is carried in a demodulation reference signal (DMRS).

Example 116 includes the apparatus of any of Examples 101 to 115, wherein the processor is further configured to encode a retransmission of an initial transmission of the Msg3 using the same amount of resources as that for the initial transmission, when the amount of resources for the retransmission indicated by an access node is larger than the amount of resources used by the UE for the initial transmission.

Example 117 includes the apparatus of any of Examples 101 to 115, wherein the processor is further configured to encode a retransmission of an initial transmission of the Msg3 using the amount of resources indicated by an access node for the retransmission.

Example 118 includes the apparatus of any of Examples 101 to 117, wherein the UE is operable in a narrowband internet of thing (NB IoT) system or an enhanced machine type communication (eMTC) system.

Example 119 includes a method performed by a user equipment (UE), comprising: encoding a physical random access channel (PRACH) sequence from a plurality of PRACH sequence for transmission via a PRACH to perform a random access procedure, wherein indication of support of early data transmission (EDT) that is transmitted during the random access procedure is based on at least one of the plurality of PRACH sequences, higher layer signaling, PRACH resources, PRACH formats, and a payload from the UE.

Example 120 includes the method of Example 119, wherein the EDT comprises uplink (UL) transmission and downlink (DL) transmission.

Example 121 includes the method of Example 119, wherein the higher layer signaling comprises at least one of a system information (SI) message and dedicated higher layer signaling.

Example 122 includes the method of Example 119, wherein the EDT is enabled based on coverage enhancement (CE) levels.

Example 123 includes the method of Example 119, wherein the PRACH resources are divided into different partitions, and one or more partitions of the PRACH resources are configured to support the EDT.

Example 124 includes the method of Example 123, wherein the PRACH resources comprise at least one of time resources and frequency resources.

Example 125 includes the method of Example 124, wherein different frequency hopping patterns are configured for different partitions of the PRACH resources.

Example 126 includes the method of Example 119, wherein the plurality of PRACH sequences are divided into different partitions, and one or more partitions of the plurality of PRACH sequences are configured to support the EDT.

Example 127 includes the method of Example 126, wherein the partitions of the plurality of PRACH sequences are divided based on at least one of root indexes and cyclic shifts.

Example 128 includes the method of Example 123 or 126, wherein a number of the partitions of the PRACH resources or a number of the plurality of PRACH sequences is configured to indicate support and/or requirement of multiple transport block size (TBS) values for the EDT.

Example 129 includes the method of Example 123 or 126, wherein the partitions of the PRACH resources or the plurality of PRACH sequences are further divided for different CE levels.

Example 130 includes the method of Example 123 or 126, wherein the partitions of the PRACH resources or the plurality of PRACH sequences are further divided for UL transmission and DL transmission of the EDT separately or for both of the UL transmission and the DL transmission of the EDT.

Example 131 includes the method of Example 119, wherein the PRACH formats comprises single-tone PRACH and multi-tone PRACH.

Example 132 includes the method of Example 119, wherein the payload from the UE is transmitted following the PRACH sequence to indicate whether the UE supports the EDT or not.

Example 133 includes the method of Example 119, wherein the payload is further configured to indicate a desired TBS value for UL transmission of the EDT.

Example 134 includes a method performed by a user equipment (UE), comprising: receiving a random access response (RAR) from an access node; decoding the RAR to obtain an uplink (UL) grant; and determining whether the UL grant is used for scheduling of early data transmission (EDT) that is transmitted during a random access procedure.

Example 135 includes the method of Example 134, wherein whether the UL grant is used for scheduling of EDT is determined based on an indicator, wherein the indicator is carried via one of an additional bit in the UL grant, a reserved bit in the RAR, an additional bit in the RAR other than the UL grant, a new field in a medium access control (MAC) header for the RAR, and a reserved state indicated by a field of the UL grant.

Example 136 includes the method of Example 135, wherein the UL grant comprises a modulation and coding scheme (MCS)/transport block size (TBS) indication field, wherein the MCS/TBS indication field comprises less bits than that for a random access procedure without EDT.

Example 137 includes the method of Example 135, wherein the UL grant comprises a MCS/TBS indication field, wherein the MCS/TBS indication field comprises more bits than that for a random access procedure without EDT.

Example 138 includes the method of Example 135, wherein the UL grant comprises a MCS/TBS indication field, wherein the MCS/TBS indication field is configured to indicate a combination of a modulation scheme and/or a coding scheme with a TBS value.

Example 139 includes the method of Example 135, wherein the UL grant comprises a physical resource block (PRB) assignment field, wherein the PRB assignment field comprises less bits than that for a random access procedure without EDT.

Example 140 includes the method of Example 135, wherein the UL grant comprises at least one of a UL subcarrier spacing field, a Msg3 subcarrier allocation field, a resource assignment field and a MCS/TBS indication field, and wherein at least one of the UL subcarrier spacing field, the Msg3 subcarrier allocation field, the resource assignment field and the MCS/TBS indication field comprises less bits than that for a random access procedure without EDT.

Example 141 includes the method of Example 135, wherein one of the additional bit in the UL grant, the reserved bit in the RAR, and the additional bit in the RAR other than the UL grant is configured to indicate whether a field in the UL grant is required to be interpreted in a different way from that for a random access procedure without EDT.

Example 142 includes the method of Example 134, wherein the UL grant comprises a second additional bit to indicate offset to a TBS value.

Example 143 includes the method of Example 134, further comprising: determining, when the UE transmits a physical random access channel (PRACH) sequence via a PRACH resource that is dedicated for the EDT or the UE transmits a PRACH sequence dedicated for the EDT, that the UL grant is used for scheduling of EDT.

Example 144 includes the method of Example 134, wherein the UL grant has a size that is different from that for a random access procedure without EDT.

Example 145 includes the method of Example 144, wherein the size of the UL grant is indicated by an additional field in a MAC header for the RAR.

Example 146 includes the method of Example 134, further comprising determining that the UL grant is used for scheduling of EDT, wherein the UL grant has a size that is the same as that of an UL grant in the RAR in a random access procedure without EDT.

Example 147 includes the method of Example 134, wherein the UL grant comprises a MCS/TBS indication field, wherein the MCS/TBS indication field is interpreted in a different way from that for a random access procedure without EDT.

Example 148 includes the method of Example 134, wherein the RAR has a RAR format and size that is the same as that for a random access procedure without EDT.

Example 149 includes the method of Example 134, further comprising: performing a random access procedure without EDT when determining the UL grant is not used for scheduling of EDT.

Example 150 includes a method performed by a user equipment (UE), comprising: determining whether to monitor an explicit acknowledge (ACK) in response to Msg3; and monitoring the explicit ACK when it is determined to monitor the explicit ACK.

Example 151 includes the method of Example 150, wherein whether to monitor the explicit ACK is determined based on at least one of Msg2, predefinition, and a system information (SI) message.

Example 152 includes the method of Example 150, wherein a new radio network temporary identity (RNTI) is defined for physical downlink control channel (PDCCH) for scheduling Msg2, to indicate the explicit ACK.

Example 153 includes the method of Example 150, wherein a temporary cell radio network temporary identity (Temp C-RNTI) is used for PDCCH for scheduling Msg2, to indicate the explicit ACK.

Example 154 includes the method of Example 150, wherein a first unused value or a first reserved state indicated by a field of Msg2 is configured to indicate the explicit ACK.

Example 155 includes the method of Example 150, wherein a second unused value or a second reserved state indicated by a field of Msg2 is configured to indicate the UE to go to an idle mode after successful transmission of Msg3 that comprises early data transmission (EDT).

Example 156 includes the method of Example 150, wherein a third unused value or a third reserved state indicated by a field of Msg2 is configured to indicate the UE to go to an idle mode after successful reception of Msg4 that comprises early data transmission (EDT).

Example 157 includes the method of Example 150, further comprising: controlling, after the explicit ACK is received, the UE to go to an idle mode.

Example 158 includes the method of Example 157, wherein the explicit ACK comprises contention resolution related information.

Example 159 includes the method of Example 150, further comprising: controlling, after the explicit ACK is received, the UE to monitor PDCCH that schedules Msg3 retransmission or Msg4.

Example 160 includes the method of Example 150, further comprising: determining, based on Msg2, whether to go to an idle mode or continue to monitor for PDCCH for scheduling of Msg3 retransmission or Msg4 upon reception of the explicit ACK.

Example 161 includes the method of Example 150, further comprising: monitoring PDCCH that schedules Msg3 retransmission or Msg4 simultaneously with the explicit ACK.

Example 162 includes the method of Example 150, further comprising: monitoring the explicit ACK during a monitoring window; and monitoring PDCCH that schedules Msg3 retransmission or Msg4 outside the monitoring window.

Example 163. A method performed by a user equipment (UE), comprising: determining, based on an indicator, whether to allow the UE to go to an idle mode upon expiration of a timer after transmission of an acknowledge (ACK) in response to Msg4; and sending the ACK to an access node that transmits the Msg4.

Example 164 includes the method of Example 163, wherein the indicator is carried in at least one of a system information (SI) message, Msg2, and physical downlink control channel (PDCCH) that schedules transmission or retransmission of the Msg4.

Example 165 includes the method of Example 163, wherein the timer is predefined or configured by a SI message.

Example 166 includes the method of Example 163, wherein the timer is predefined or configured based on CE levels.

Example 167 includes the method of Example 163, wherein a new radio network temporary identity (RNTI) is defined for physical downlink control channel (PDCCH) that schedules transmission or retransmission of the Msg4 to indicate the UE to go to the idle mode after successful transmission of the ACK for the Msg 4.

Example 168 includes the method of Example 163, wherein an unused value or a reserved state indicated by a field of Msg2 is configured to indicate the UE to go to the idle mode after successful transmission of the ACK for the Msg 4.

Example 169 includes a method performed by a user equipment (UE), comprising: determining a first candidate transport block size (TBS) value as the largest candidate TBS value of a plurality of candidate TBS values; and determining, based on the first candidate TBS value, a target TBS value for transmission of Msg3 with early data transmission (EDT) that is transmitted during a random access procedure.

Example 170 includes the method of Example 169, wherein the first candidate TBS value is determined based on a maximum TBS value indicated by a system information (SI) message.

Example 171 includes the method of Example 170, wherein the first candidate TBS value is determined to be equal to the maximum TBS value.

Example 172 includes the method of Example 170, wherein the first candidate TBS value is determined further based on a number of resource allocation units allocated to the UE.

Example 173 includes the method of Example 172, wherein the first candidate TBS value is determined to be a TBS value of a plurality of TBS values corresponding to the allocated number of resource allocation units, wherein the TBS value is the largest one of the plurality of TBS values that is equal to or smaller than the maximum TBS value.

Example 174 includes the method of Example 170, further comprising: determining a second candidate TBS value of the plurality of candidate TBS values based on a modulation and coding scheme (MCS)/TBS indication field in an UL grant for the Msg3 with EDT, wherein the target TBS value for transmission of the Msg3 with EDT is determined based on both of the first candidate TBS value and the second candidate TBS value.

Example 175 includes the method of Example 174, further comprising: determining one or more remaining candidate TBS values of the plurality of candidate TBS values based on the first candidate TBS value and the second candidate TBS value, wherein the target TBS value for transmission of the Msg3 with EDT is determined based on the first candidate TBS value, the second candidate TBS value and the one or more remaining candidate TBS values.

Example 176 includes the method of Example 169, wherein the first candidate TBS value is determined based on a MCS/TBS indication field in an uplink (UL) grant for the Msg3 with EDT.

Example 177 includes the method of Example 169, further comprising: determining one or more remaining candidate TBS values of the plurality of candidate TBS values based on the first candidate TBS value, wherein the one or more remaining candidate TBS values are smaller than the first candidate TBS value, and wherein the target TBS value for transmission of the Msg3 with EDT is determined based on both of the first candidate TBS value and the one or more remaining candidate TBS values.

Example 178 includes the method of Example 177, wherein the one or more remaining candidate TBS values are determined based on a mapping between the first candidate TBS value and the one or more remaining candidate TBS values.

Example 179 includes the method of Example 178, wherein the mapping includes a table indicating the first candidate TBS value and corresponding one or more remaining candidate TBS values.

Example 180 includes the method of Example 178, wherein the mapping includes a function between the first candidate TBS value and the one or more remaining candidate TBS values.

Example 181 includes the method of Example 169, wherein maximum of a number of the plurality of candidate TBS values is 4.

Example 182 includes the method of Example 169, further comprising: using the same frequency domain resource for all of the plurality of candidate TBS values.

Example 183 includes the method of Example 182, wherein the frequency domain resource is indicated by an uplink (UL) grant for the transmission of Msg3 from an access node.

Example 184 includes the method of any of Examples 169 to 183, wherein each of the plurality of candidate TBS values is indicated by a respective TBS index.

Example 185 includes a method performed a user equipment (UE), comprising: receiving a modulation and coding scheme (MCS)/transport block size (TBS) indication field of an uplink (UL) grant or a resource assignment field from an access node; and determining, based on the MCS/TBS indication field or the resource assignment field, a number of resource allocation units for Msg3 with early data transmission (EDT) that is transmitted during a random access procedure.

Example 186 includes the method of Example 185, wherein the number of resource allocation units is determined for all of a plurality of candidate TBS values available to the UE.

Example 187 includes the method of Example 185, wherein the number of resource allocation units is determined for a first candidate TBS value of a plurality of candidate TBS values available to the UE.

Example 188 includes the method of Example 187, wherein the first candidate TBS value is the largest one among the plurality of candidate TBS values.

Example 189 includes the method of Example 187, wherein a number of resource allocation units for a second candidate TBS value of the plurality of candidate TBS values is determined based on a mapping between the first candidate TBS value and the second candidate TBS value.

Example 190 includes the method of Example 187, wherein the number of resource allocation units for the first candidate TBS value is determined based on a first portion of bits in the MCS/TBS indication field.

Example 191 includes the method of Example 190, wherein a number of resource allocation units for a second candidate TBS value of the plurality of candidate TBS values is determined based on a second portion of bits in the MCS/TBS indication field.

Example 192 includes the method of Example 191, wherein the second portion of bits in the MCS/TBS indication field is configured to indicate whether the number of resource allocation units for the second candidate TBS value is equal to a predefined number.

Example 193 includes the method of Example 185, wherein the number of resource allocation units is determined based on a plurality of states indicated by the MCS/TBS indication field.

Example 194 includes the method of Example 193, wherein the number of resource allocation units is determined further based on a maximum TBS value indicated by the access node.

Example 195 includes the method of Example 193, wherein a number of resource allocation units for a first candidate TBS value of a plurality of candidate TBS values available to the UE is determined based on a first portion of the plurality of states indicated by the MCS/TBS indication field.

Example 196 includes the method of Example 195, wherein a number of resource allocation units for a second candidate TBS value of the plurality of candidate TBS values is determined based on a second portion of the plurality of states indicated by the MCS/TBS indication field.

Example 197 includes the method of Example 196, wherein the second portion of the plurality of states indicated by the MCS/TBS indication field is configured to indicate whether the number of resource allocation units for the second candidate TBS value is equal to a predefined number.

Example 198 includes the method of Example 185, further comprising: determining a modulation scheme and/or a coding scheme for the Msg3 based on the MCS/TBS indication field.

Example 199 includes the method of Example 198, wherein the modulation scheme comprises QPSK when the Msg3 is transmitted with a multi-tone mode.

Example 200 includes the method of Example 198, wherein the modulation scheme comprises pi/2 binary phase shift keying (BPSK) and pi/4 quadrature phase shift keying (QPSK) when the Msg3 is transmitted with a single-tone mode.

Example 201 includes the method of Example 200, wherein the pi/4 QPSK is used for the Msg3 transmitted with the single-tone mode irrespective of TBS values and the number of resource allocation units.

Example 202 includes the method of Example 200, wherein selection of the pi/2 BPSK and the pi/4 QPSK is based on TBS values and the number of resource allocation units.

Example 203 includes the method of Example 202, wherein the modulation scheme comprises pi/2 BPSK when TBS value is 328 and the number of resource allocation units is 8 or 10; otherwise the modulation scheme comprises pi/4 QPSK.

Example 204 includes the method of Example 185 to 203, wherein the resource assignment field comprises one of physical resource block (PRB) assignment field and resource unit (RU) assignment field.

Example 205 includes the method of any of Examples 185 to 204, wherein the resource allocation units comprise one of physical resource blocks (PRBs), resource units (RUs), and subcarriers.

Example 206 includes a method performed by a user equipment (UE), comprising: decoding a repetition number field of an uplink (UL) grant for Msg3 with early data transmission (EDT) that is transmitted during a random access procedure to obtain a number of repetitions indicated by the repetition number field; and determining a number of repetitions for a first candidate transport block size (TBS) value of a plurality of candidate TBS values based on the number of repetitions indicated by the repetition number field.

Example 207 includes the method of Example 206, further comprising: determining a number of repetitions for each of the plurality of candidate TBS values to be equal to the number of repetitions indicated by the repetition number field.

Example 208 includes the method of Example 206, further comprising: determining the number of repetitions indicated by the repetition number field as the number of repetitions for the first candidate TBS value.

Example 209 includes the method of Example 208, wherein the first candidate TBS value is the largest one among the plurality of candidate TBS values.

Example 210 includes the method of Example 209, further comprising: determining a number of repetitions for a second candidate TBS value of the plurality of candidate TBS values based on a mapping between the number of repetitions for the first candidate TBS value and the number of repetitions for the second candidate TBS value.

Example 211 includes the method of Example 210, wherein the number of repetitions for the first candidate TBS value is greater than the number of repetitions for the second candidate TBS value.

Example 212 includes the method of Example 208, further comprising: determining a number of repetitions for a second candidate TBS value of the plurality of candidate TBS values based on a portion of bits in a modulation and coding scheme (MCS)/TBS indication field of the UL grant or a portion of states indicated by the MCS/TBS indication field.

Example 213 includes the method of Example 212, wherein the portion of bits in the MCS/TBS indication field or the portion of states indicated by the MCS/TBS indication field is configured to indicate whether the number of repetitions for the second candidate TBS value is equal to a predefined number.

Example 214 includes the method of Example 206, further comprising: determining the number of repetitions for the first candidate TBS value and a number of repetitions for a second candidate TBS value of the plurality of candidate TBS values based on a maximum TBS value configured by an access node serving the UE.

Example 215 includes the method of Example 214, wherein the number of repetitions for the first candidate TBS value and the number of repetitions for the second candidate TBS value are determined further based on a mapping between the number of repetitions indicated by the repetition number field and each of the number of repetitions for the first candidate TBS value and the number of repetitions for the second candidate TBS value.

Example 216 includes the method of Example 215, wherein the mapping comprises one or more sets of scaling factors for the number of repetitions for the first candidate TBS value and the number of repetitions for the second candidate TBS value with respect to the number of repetitions indicated by the repetition number field.

Example 217 includes the method of Example 216, wherein the one or more sets of scaling factors comprise more than one sets of scaling factors, and wherein which set of scaling factors to be used is indicated by higher layer signaling or the UL grant.

Example 218 includes the method of Example 216, wherein the one or more sets of scaling factors comprise one set of scaling factors, and wherein the one set of scaling factors is predefined.

Example 219 includes a method performed by a user equipment (UE), comprising: encoding an indicator in a Msg3 with early data transmission (EDT) that is transmitted during a random access procedure, wherein the indicator is configured to indicate a target transport block size (TBS) value selected by the UE.

Example 220 includes the method of Example 219, wherein the indicator comprises one or more bits, and wherein a number of the bits is based on a maximum TBS value configured by an access node serving the UE.

Example 221 includes the method of Example 220, wherein the indicator comprises one bit when the maximum TBS value is equal to or smaller than a threshold, and the indicator comprises two bits when the maximum TBS value is greater than the threshold.

Example 222 includes the method of Example 220, wherein the indicator comprises one bit to indicate whether the selected target TBS value is greater than half of the maximum TBS value.

Example 223 includes the method of Example 219, wherein the indicator comprises two bits.

Example 224 includes the method of Example 219, wherein the indicator is piggybacked following uplink control information (UCI) on physical uplink share channel (PUSCH).

Example 225 includes the method of Example 219, wherein the indicator is carried in an initial transmission of the Msg3.

Example 226 includes the method of Example 225, wherein the indicator is carried in first one or more subframes for the initial transmission.

Example 227 includes the method of Example 219, wherein the indicator is carried in each of an initial transmission of the Msg3 and one or more of repetitions of the initial transmission.

Example 228 includes the method of Example 227, wherein a number of the one or more repetitions to carry the indicator is determined based on at least one of predefinition, higher layer signaling, a number of repetitions of the initial transmission to be used for the smallest TBS value available to the UE, a maximum TBS value configured by an access node serving the UE, and a number of repetitions of the initial transmission indicated by the access node.

Example 229 includes the method of Example 227, wherein the indicator is carried in first one or more subframes for each of the initial transmission and the one or more repetitions.

Example 230 includes the method of Example 226 or 229, wherein a number of the one or more repetitions to carry the indicator is determined based on at least one of predefinition, higher layer signaling, a number of repetitions of the initial transmission indicated by an access node serving the UE, a maximum TBS value configured by the access node, and a number of subframes for the maximum TBS value.

Example 231 includes the method of Example 219, wherein the indicator is carried in first one or more symbols within each of one or more subframes.

Example 232 includes the method of Example 231, wherein the one or more subframes comprise a subframe for a repetition of an initial transmission of the Msg3.

Example 233 includes the method of Example 219, wherein the indicator is carried in a demodulation reference signal (DMRS).

Example 234 includes the method of any of Examples 219 to 233, further comprising: encoding a retransmission of an initial transmission of the Msg3 using the same amount of resources as that for the initial transmission, when the amount of resources for the retransmission indicated by an access node is larger than the amount of resources used by the UE for the initial transmission.

Example 235 includes the method of any of Examples 219 to 233, further comprising: encoding a retransmission of an initial transmission of the Msg3 using the amount of resources indicated by an access node for the retransmission.

Example 236 includes the method of any of Examples 219 to 235, wherein the UE is operable in a narrowband internet of thing (NB IoT) system or an enhanced machine type communication (eMTC) system.

Example 237 includes a non-transitory computer-readable medium having instructions stored thereon, the instructions when executed by one or more processor(s) causing the processor(s) to perform the method of any of Examples 119-236.

Example 238 includes an apparatus for user equipment (UE), comprising means for performing the actions of the method of any of Examples 119-236.

Example 239 includes a user equipment (UE) as shown and described in the description.

Example 240 includes an access node (AN) as shown and described in the description.

Example 241 includes a method performed at user equipment (UE) as shown and described in the description.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the appended Examples and the equivalents thereof.

What is claimed is:

1. An apparatus for a user equipment (UE), comprising:
a processor configured to:
encode a physical random access channel (PRACH) sequence for transmission via a PRACH to perform a random access procedure, wherein indication of support of early data transmission (EDT) that is transmitted during the random access procedure is based on at least one of higher layer signaling, PRACH resources, PRACH sequences, PRACH formats, or a payload from the UE; and
send the PRACH sequence to a radio frequency (RF) interface; and
the RF interface to receive the PRACH sequence from the processor,
wherein the PRACH sequences are divided into different partitions, and one or more partitions of the PRACH sequences are configured to support the EDT.

2. The apparatus of claim 1, wherein the EDT comprises uplink (UL) transmission and downlink (DL) transmission.

3. The apparatus of claim 1, wherein the higher layer signaling comprises at least one of a system information (SI) message and dedicated higher layer signaling.

4. The apparatus of claim 1, wherein the EDT is enabled based on coverage enhancement (CE) levels.

5. The apparatus of claim 1, wherein the PRACH resources are divided into different partitions, and one or more partitions of the PRACH resources are configured to support the EDT.

6. The apparatus of claim 5, wherein the PRACH resources comprise one or both of time resources and frequency resources.

7. The apparatus of claim 6, wherein different frequency hopping patterns are configured for different partitions of the PRACH resources.

8. The apparatus of claim 1, wherein the partitions of the PRACH sequences are divided based on one or both of root indexes and cyclic shifts.

9. The apparatus of claim 1, wherein the number of the partitions of the PRACH resources or PRACH sequences is configured to indicate support and/or requirement of multiple transport block size (TBS) values for the EDT.

10. The apparatus of claim 1, wherein the partitions of the PRACH resources or PRACH sequences are further divided for different coverage enhancement (CE) levels.

11. The apparatus of claim 1, wherein the partitions of the PRACH resources or PRACH sequences are further divided for uplink (UL) transmission and downlink (DL) transmission of the EDT separately or for both of the UL transmission and the DL transmission of the EDT.

12. The apparatus of claim 1, wherein the PRACH formats comprises single-tone PRACH and multi-tone PRACH.

13. The apparatus of claim 1, wherein the payload from the UE is transmitted following the PRACH sequence to indicate whether the UE supports the EDT or not.

14. The apparatus of claim 1, wherein the payload is further configured to indicate a desired TBS value for UL transmission of the EDT.

15. An apparatus for a user equipment (UE), comprising:
a radio frequency (RF) interface to receive a random access response (RAR) from an access node; and
a processor configured to:
receive the RAR from the RF interface; decode the RAR to obtain an uplink (UL) grant; and
determine whether the UL grant is used for scheduling of early data transmission (EDT) that is transmitted during a random access procedure,
wherein whether the UL grant is used for scheduling of EDT is determined based on an indicator, wherein the indicator is carried via one of an additional bit in the UL grant, a reserved bit in the RAR, an additional bit in the RAR other than the UL grant, a new field in a medium access control (MAC) header for the RAR, or a reserved state indicated by a field of the UL grant.

16. The apparatus of claim 15, wherein the UL grant comprises a modulation and coding scheme (MCS)/transport block size (TBS) indication field, wherein the MCS/TBS indication field comprises less bits than that for a random access procedure without EDT.

17. The apparatus of claim 15, wherein the UL grant comprises a MCS/TBS indication field, wherein the MCS/TBS indication field comprises more bits than that for a random access procedure without EDT.

18. The apparatus of claim 15, wherein the UL grant comprises a modulation and coding scheme (MCS)/transport block size (TBS) indication field, wherein the MCS/TBS indication field is configured to indicate a combination of a modulation scheme and a TBS value.

19. The apparatus of claim 15, wherein the UL grant comprises a physical resource block (PRB) assignment field, wherein the PRB assignment field comprises less bits than that for a random access procedure without EDT.

20. The apparatus of claim 15, wherein the UL grant comprises at least one of a UL subcarrier spacing field, a Msg3 subcarrier allocation field, a resource assignment field and a modulation and coding scheme (MCS)/transport block size (TBS) indication field, and wherein at least one of the UL subcarrier spacing field, the Msg3 subcarrier allocation field, the resource assignment field and the MCS/TBS indication field comprises less bits than that for a random access procedure without EDT.

21. The apparatus of claim 15, wherein one of the additional bit in the UL grant, the reserved bit in the RAR, and the additional bit in the RAR other than the UL grant is configured to indicate whether a field in the UL grant is required to be interpreted in a different way from that for a random access procedure without EDT.

22. The apparatus of claim 15, wherein the UL grant comprises a second additional bit to indicate offset to a transport block size (TBS) value.

23. The apparatus of claim 15, wherein the processor is configured to determine the UL grant is used for scheduling of EDT, when the UE transmits a physical random access channel (PRACH) sequence via a PRACH resource that is dedicated for the EDT or the UE transmits a PRACH sequence dedicated for the EDT.

24. An apparatus for a user equipment (UE), comprising:
a processor configured to:
encode a physical random access channel (PRACH) sequence for transmission via a PRACH to perform a random access procedure, wherein indication of support of early data transmission (EDT) is transmitted during PRACH sequences, wherein the PRACH sequences are divided into different partitions, and one or more partitions of the PRACH sequences are configured to support the EDT; and
send the PRACH sequence to a radio frequency (RF) interface; and
the RF interface configured to receive the PRACH sequence from the processor.

25. The apparatus of claim 24, wherein the partitions of the PRACH sequences are further divided for uplink (UL) transmission and downlink (DL) transmission of the EDT separately, or for both of the UL transmission and the DL transmission of the EDT.

* * * * *

UNITED STATES PATENT AND TRADEMARK OFFICE
CERTIFICATE OF CORRECTION

| | | |
|---|---|---|
| PATENT NO. | : 10,779,333 B2 | Page 1 of 1 |
| APPLICATION NO. | : 16/141202 | |
| DATED | : September 15, 2020 | |
| INVENTOR(S) | : Ye et al. | |

It is certified that error appears in the above-identified patent and that said Letters Patent is hereby corrected as shown below:

On the Title Page

Item (54), and in the Specification, Column 1, Lines 1-2, Title, "Early data transmission in wireless communication system" should read --Design of early data transmission in wireless communication system--.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*